(12) United States Patent
McConaghy

(10) Patent No.: US 6,910,192 B2
(45) Date of Patent: *Jun. 21, 2005

(54) METHOD OF ROBUST TECHNOLOGY DESIGN USING RATIONAL ROBUST OPTIMIZATION

(75) Inventor: Trent Lorne McConaghy, Ottawa (CA)

(73) Assignee: Synopsys, Inc., Mountain View, CA (US)

( * ) Notice: Subject to any disclaimer, the term of this patent is extended or adjusted under 35 U.S.C. 154(b) by 229 days.

This patent is subject to a terminal disclaimer.

(21) Appl. No.: 10/227,801

(22) Filed: Aug. 27, 2002

(65) Prior Publication Data

US 2003/0046278 A1 Mar. 6, 2003

Related U.S. Application Data

(60) Provisional application No. 60/317,145, filed on Sep. 6, 2001.

(51) Int. Cl.$^7$ ............................. G06F 17/50; G06G 7/62; G06N 3/12
(52) U.S. Cl. ................................. 716/2; 716/4; 703/13; 706/13
(58) Field of Search .......................... 716/1–2, 4; 703/2, 703/6, 13, 22; 706/13

(56) References Cited

U.S. PATENT DOCUMENTS

| | | | |
|---|---|---|---|
| 5,418,974 A | * | 5/1995 | Craft et al. ..................... 716/2 |
| 5,867,397 A | | 2/1999 | Koza et al. |
| 6,132,108 A | * | 10/2000 | Kashiwamura et al. ........ 703/2 |
| 6,360,191 B1 | * | 3/2002 | Koza et al. .................... 703/6 |

FOREIGN PATENT DOCUMENTS

| | | |
|---|---|---|
| EP | 0 592 034 | 4/1994 |
| EP | 0 855 661 | 7/1998 |
| GB | 2 354 096 | 3/2001 |

* cited by examiner

*Primary Examiner*—Leigh M. Garbowski
(74) *Attorney, Agent, or Firm*—Bever, Hoffman & Harms, LLP; Jeanette S. Harms

(57) ABSTRACT

Robust design using a search engine in to solve technological design problems. The method including selecting one of first and second candidates based on at least one objective function, sampling the first candidate and determining one or more sample objective function values for the first candidate. The method continues by sampling the second candidate and determining one or more sample objective function values for the second candidate, then statistically determining, based on the sampled objective function values, corresponding first and second statistical estimators of design quality; and comparing the first and second statistical estimators of design quality. The method continues to take more samples and make more estimates adaptively, until a given level of certainty about one individual being best ("winning individual") is surpassed, at which point the said winning individual is selected.

6 Claims, 17 Drawing Sheets

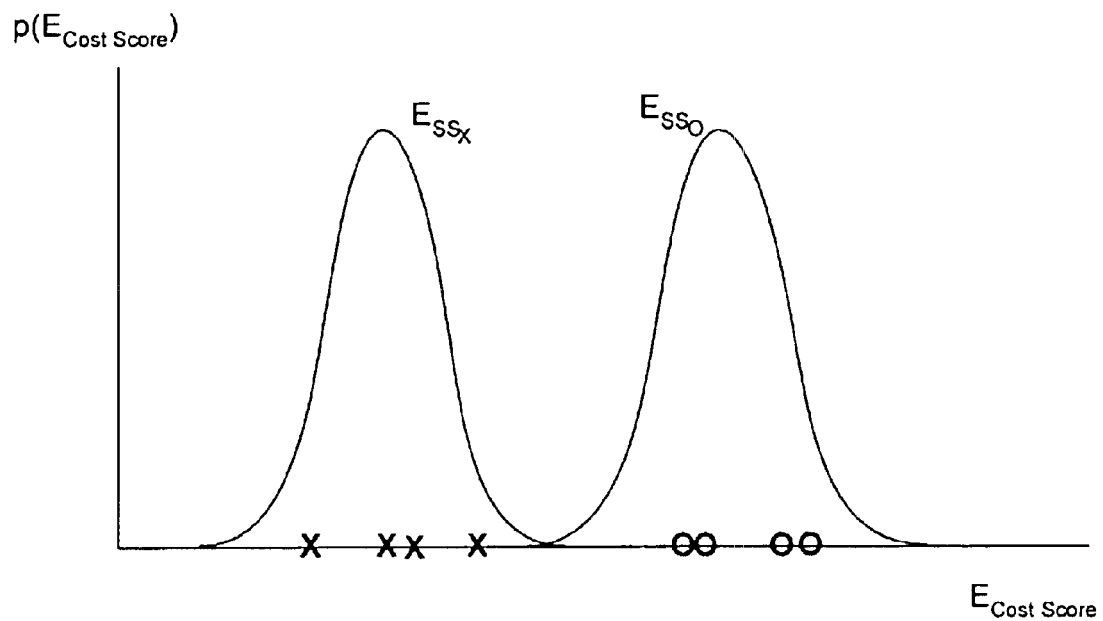
Fig. 16
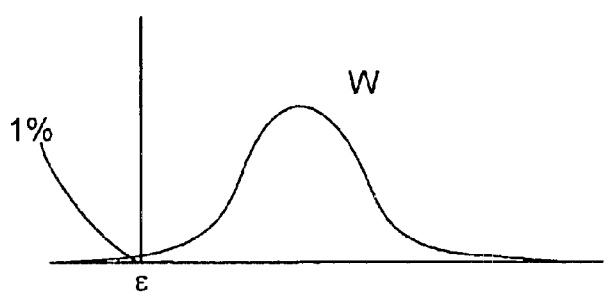

METHOD OF ROBUST TECHNOLOGY DESIGN USING RATIONAL ROBUST OPTIMIZATION

This application claims priority from U.S. Provisional Patent Application No. 60/317,145, filed Sep. 6, 2001.

FIELD OF THE INVENTION

The present invention relates to a method for the optimization of robust designs using a search engine, and a search engine for implementing such a method. More particularly, the present invention relates to optimization where decision making in the search engine is made under uncertainty.

BACKGROUND OF THE INVENTION

A search engine is an algorithm, typically implemented on a general purpose computer, that traverses a space of possible candidate designs in a manner to try to find one or more improved candidate designs by trying to improve upon one or more objective functions. Search engines can be used to solve complex problems that are intractable and defy direct solution, or for which theoretically known approaches are impractical because they require too much time or other resources or are too inconvenient to bother modeling.

Search engines differ by the search space or design space on which they operate. For example, the design space of a typical parameter search engine is a subset of a multidimensional space of real numbers, i.e. $R^n$. Other candidate spaces are also possible, for example, data structures such as a tree, a graph, etc.

Search engines are used in a variety of disciplines ranging from academic research to industrial applications. Because of the widespread use of search engines, they have been carefully studied. Techniques have been discovered to improve performance and eliminate unproductive search paths. While some of the techniques and principles are generally applicable, other techniques or refinements are based on the specific nature of the problem in question.

One example of the need to refine search engine techniques is in engineering or industrial design problems in which there is a need to deal with uncertainty. For example, in the large-scale production of any manufacture, real-world considerations such as machine tolerances, individual variation in components and other factors affect the quality and performance of the final product. Such variations can often be regarded as random and modelled, for example, using a Gaussian probability distribution. Robustness is a characteristic of a design that qualifies how well that design performs in the face of variation. A robust design process refers to an approach to reducing the effects of variation by predicting the likely magnitude of such variations and accounting for them in the specifications, models and design of the product.

Since automated search techniques can be used to aid design, it is useful to consider incorporating robustness into automated search in a robust design process. One well-known approach to robust search problems is the "brute-force" Monte Carlo search method. Monte Carlo sampling is the process of drawing random samples from a process that has variation. The "brute-force" Monte Carlo search method replaces a standard objective function with a variation-induced objective function by taking a fixed number of Monte Carlo samples, then performing a statistical estimate on those samples, and trying to optimize those statistical estimates in the same manner as if they were deterministic objective functions. This method is combined with standard search engines that have typically originally been used in search on deterministic objective functions, e.g. evolutionary algorithms and simulated annealing. The "brute force" Monte Carlo search method is quite problem independent because it is independent of specific characteristics of the underlying variation; it just needs to be able to draw Monte Carlo samples. This makes it a very useful in attacking problems that are not solvable in closed form; it is, in general a very flexible approach to robust optimization, and is sometimes the only conceivable method of robust optimization for particular problems.

As is well known in statistical theory, increasing the sample size can reduce the amount of uncertainty in estimation of the underlying process. Accordingly, the standard technique to reduce the uncertainty in "brute-force" Monte Carlo search method is to increase the (pre-set) number of samples. Unfortunately, increasing the sample size increases the amount of computing power and other resources required. It is not uncommon to run 50 or even 500 Monte Carlo samples at a design point in order to keep uncertainty low. That means that "brute-force" Monte Carlo search need roughly 50 to 500 more computational effort than a comparable non-robust search. If the computing demands are excessive, then the finite amount of available resources, including time, may constrain the types of problems that can be solved by this approach. It is, therefore, desirable to provide a method that preserves the utility and power of such search engines while reducing the computing demands and constraints that are associated with existing methods.

Other types of search engines invented for robust design problems employ relatively fast, specialized algorithms that rely on a particular closed form description of the underlying process, or make assumptions about the underlying process. The advantage is that these techniques are able to use less computational effort than a generalized "brute force" Monte Carlo search method. The drawback is that these approaches are only able to solve a subset of all robust optimization problems.

In summary, the "brute force" Monte Carlo approach to robust design has the advantage of broad applicability and flexibility, with the disadvantage of needing significant computing resources. The approach of having specialized algorithms for robust design has the advantage of needing less computational resources, with the disadvantage of limited applicability and flexibility. There is a desire to have an approach to robust design that has broad applicability and flexibility, yet requires less computing resources than the "brute-force" Monte Carlo approach.

SUMMARY OF THE INVENTION

It is an object of the present invention to obviate or mitigate at least one disadvantage of previous methods associated with search engines applied to robust design. The present invention generally provides a method of comparing two or more competing candidate solutions and determining the best candidate within the framework of a search algorithm that incorporates a competition, such as evolutionary computing, simulated annealing, pattern searching with stochastic elements or tabu searching.

The present invention further provides a method of dealing with randomness in the optimization of one or more objective functions. This method is applicable to search algorithms having one or more stochastic objective functions. The present invention also provides a system or search engine associated with the above methods. The present invention addresses the robust design problem, including its application to robust design of optics, robust design of mechanical components, design of robust schedules, and robust design of opto-electrical components.

According to an aspect of the present invention there is provided in robust design problems using a search engine, a method of selecting one of a first and second technology design candidates, the method comprising: randomly sampling said first candidate to obtain a first random sample; determining at least one objective function value from said first random sample; randomly sampling said second candidate to obtain a second random sample; determining at least one objective function value from said second random sample; determining, based on said first and second objective function values comparison-oriented statistical estimates relating the first and second design candidates; selecting, if possible, based on at least one decision rule and said comparison-oriented statistical estimates, one of said design candidates; and repeating the previous steps until one of said design candidates has been selected.

According to a second aspect of the present invention, there is provided in robust design problems using a search engine, a computer-readable program product for selecting one of first and second technology design candidates based on at least one objective function, the program product comprising: means for randomly sampling said first candidate to obtain a first random sample; means for determining at least one objective function value from said first random sample; means for randomly sampling said second candidate to obtain a second random sample; means for determining at least one objective function value from said second random sample; means for determining, based on said first and second objective function values comparison-oriented statistical estimates relating the first and second design candidates; means for selecting, if possible, based on at least one decision rule and said comparison-oriented statistical estimates, one of said design candidates; and means for repeating the previous steps until one of said design candidates has been selected.

According to another aspect of the present invention, there is provided in robust design problems using a search engine, a method of selecting one of a first and second technology design candidates, the method comprising: a) defining a population of individuals; b) selecting at least one objective function that defines at least one objective function value for each individual; c) repeatedly performing the following steps until at least one stopping criterion is satisfied: 1) grouping individuals from the population into at least one group for comparison with other individuals in the group, the comparison being on the basis of their at least one objective function values 2) for each group of the at least one groups performing the following: i) for each individual of the at least one groups, sampling each individual at least one time and determining at least one corresponding objective function value; ii) statistically determining, based on the sample objective function values, corresponding statistical estimators of design quality; iii) comparing the sampled individuals within each group on the basis of the statistical estimators of design quality; iv) selecting, if there is enough statistical confidence from the comparison of the statistical estimators, one of the sampled individuals from the at least one group; v) repeating the above steps if a selection has not yet been made; and 3) replacing the population of individuals by a new population consisting of the chosen individuals from each group.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Embodiments of the present invention will now be described, by way of example only, with reference to the attached drawings, wherein:

FIG. 16 illustrates the example of FIG. 14 after still further sampling;

DETAILED DESCRIPTION

Generally, the present invention provides a method for robust design using the concept of rational robust optimization within a search engine. The method of robust design includes selecting a design candidate, or candidate design, in a technology by determining statistical estimators of design quality. The robust design method of the present invention has many applications including scheduling, chemical processing, control systems, neural networks, regression modelling unknown systems, molecular synthesis, optical circuits, photonics, communications networks, sensors and flow network design problems such as road systems, waterways and other large scale physical networks.

Figure 1:
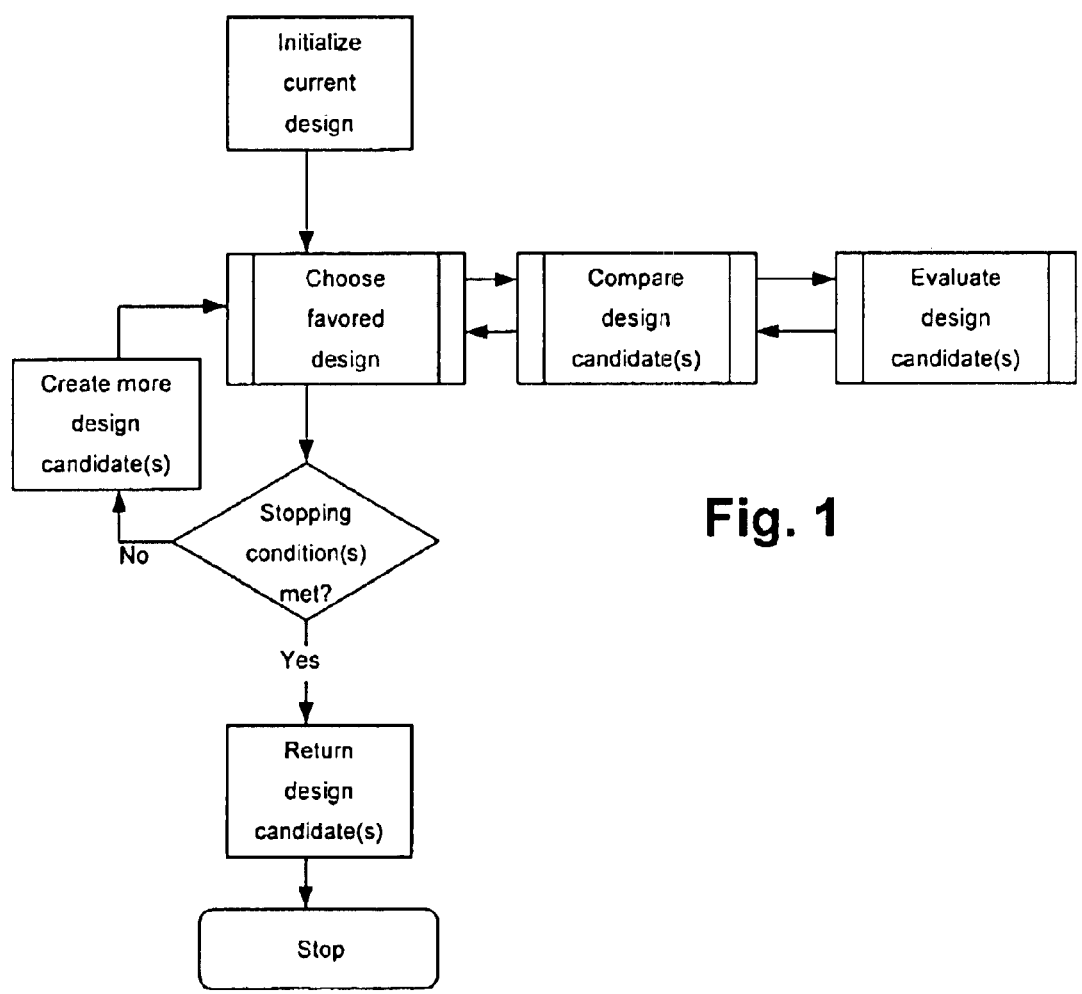
FIG. 1 is a flow chart illustrating the embodiment of a generalized class of search methods.

FIG. 1 presents the embodiment of a generalized approach to search. This approach is applicable to robust and non-robust design; single-objective and multi-objective search; and could be fully embodied by one of many algorithms, including, evolutionary algorithms, simulated annealing, pattern search (e.g. Hooke-Jeeves), and Tabu search.

In the first step of FIG. 1, a set of design candidates is initialized in one of many possible ways. Most simply, this step can be embodied by merely considering the starting design or design(s) presented to the algorithm. Alternatively, the initial design candidate(s) can be randomly generated by known methods or algorithms. It is also possible to combine both techniques by randomly generating some candidate design(s) while seeding the rest.

Then, a favored design or favored designs are selected; to do selection designs are compared; and to do comparison designs are evaluated. One application of search engines is in design of schedules. Schedules are composed of elements such as tasks, resources, and how resources are assigned to tasks over time. Designable aspects of schedules include, for example: what resources are allocated; to which task; over what time intervals; and specific designable aspects of the resources and tasks themselves. Objective functions may be, for example, to minimize the cost of the scheduled project, or minimize the makespan (i.e. the time taken to complete a schedule).

In FIG. 1, selection, comparison, and evaluation may each be embodied in one of several ways, depending on the choice of algorithm and the type of problem. For example, we could be using an evolutionary algorithm with 2-individual tournament selection on a non-stochastic single objective function; selection in this case would select the winners from a set of tournaments of two individuals each that had been set up; the winner of each tournament would be the design candidate with the best evaluated value from the single objective. Alternatively, there could be an embodiment of comparison using, for example, 5-individual tournament selection. In a pattern search such as Hooke-Jeeves on a single deterministic objective function, selection of the favored candidate would be based on the winner of comparing between the previous best design candidate and the newly proposed design candidate; comparison would be straightforward comparison of those two design candidates' respective values from evaluating the objective function. In simulated annealing, selection would have an element of randomness such that the non-winning design candidate is chosen. In optimization on multiple objectives, selection often has a bias towards nondominated individuals (A design is non-dominated if it is not worse than another individual in all respects. See discussion below with respect to tradeoffs.)

In FIG. 1, the step of creating more candidate design(s) from favored designs can be embodied in one of many ways. For example, an evolutionary algorithm typically does this via a set of evolutionary "operators" which are sometimes further segregated by "crossover" and "mutation" operators. An example "mutation" operator on a candidate schedule design might be to randomly allocate a new resource to a particular task. An example "crossover" operator might be to combine the first half (in terms of time spent) of a schedule "A" and combine it with the second half of a schedule "B" to get a new schedule. In simulated annealing, a new candidate is created via a "move" from a "move set." Such moves are synonymous with mutation operators from evolutionary algorithms. In a pattern search such as Hooke-Jeeves, creation of a new design would take into account the recent history of attempted moves, and create a new design according to the Hooke-Jeeves update rule.

In FIG. 1, stopping conditions can be embodied in one of many ways. Here are some examples. They may be met if the user decides to merely stop the search from continuing, and runs a command to stop execution. The algorithm may stop if it computes that it the rate of improvement of the value of the objective function(s) in the best result(s) so far has slowed down sufficiently. The algorithm may stop if the new designs that are being considered are all so similar to previous that it is no longer worth continuing. The algorithm may stop if all possible design points have been examined.

An important aspect of scheduling design is robustness. Robust schedule design takes into account the uncertainty of a designed schedule, such as the uncertainty in the nature of the resources (e.g. sick time for humans, breakdowns of machinery), and uncertainty in the nature of the tasks (e.g. uncertainty in length of time needed to complete a task). Robust design goals might be, for example: to minimize the expected cost of the project, or to minimize the variance in completion time. This additional requirement of robustness in schedule design requires an increase in sophistication over the simpler approaches that ignore robustness issues.

The stochastic nature of the problem of robust design means that exact values of objective functions cannot be assigned. Instead, for a given design candidate, its values must be determined by sampling. One conventional approach to sampling is to employ a Monte Carlo simulation to sample a corresponding random variable a predetermined number of times until there is near certainty of the objective function values that can be ascribed to each individual.

Let us examine particular embodiments of FIG. 1 to handle robust design. In FIG. 1, "brute force" Monte Carlo optimization is embodied by a particular choice of how to compare design candidates and how to evaluate design candidates. The scheme for evaluating a design candidate is to take a fixed number of Monte Carlo samples for each objective function. The scheme for comparing design candidates is to compare the estimates of the statistical properties of the objective function(s), e.g. the estimates of the means and the variances, and typically to choose individuals with better mean, variance, etc.

In FIG. 1, rational robust optimization is embodied by a particular choice of how to compare design candidates and how to evaluate design candidates. We apply rational tournament selection for each tournament of design candidate (s). The scheme for evaluating design candidates and for comparing design candidates is very closely coupled. One or a small number of Monte Carlo samples is taken for each design candidate for each objective function. Via statistical estimation based on the samples, for each design candidate, the probability that that design candidate is better than the other(s) by a certain amount is computed. If there is a high enough probability (i.e. high enough certainty), then a winner is chosen. If not, more Monte Carlo samples are taken, and new estimates are done, until a winner can be chosen. This is the essence of the rational robust optimization technique; the remainder of this document describes it in further detail. Note that the embodiment of rational robust optimization only concerns a specific choice of embodiment of some of the blocks in FIG. 1; this makes it adaptable to a wide range of possible full embodiments, including different algorithms (evolutionary algorithms, tabu, etc), single or multiple objectives, different ways to initialize current design candidates, different ways to choose favored design candidates, different ways to create more designs from favored designs, and different stopping conditions.

Figure 2:
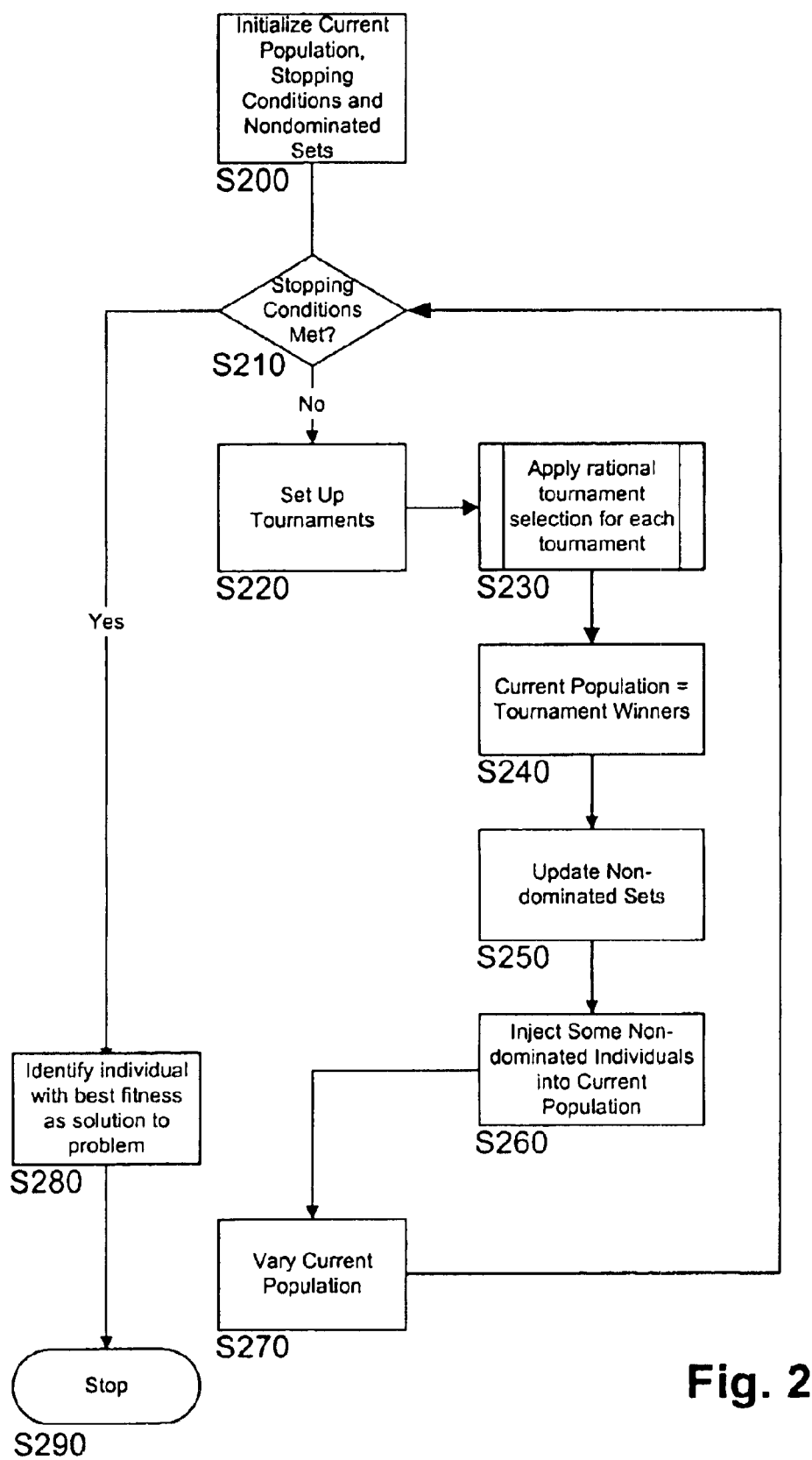
FIG. 2 is a flowchart illustrating an embodiment of the method of the present invention in which multiple objectives are present.

Referring to FIG. 2, according to an embodiment of the present invention, a method of robust design using rational robust optimization is shown. It is an example of rational tournament selection algorithm for robust design with multiple objectives placed into the context of an evolutionary algorithm. According to the embodiment of FIG. 2, an initial population is created, stopping conditions are determined and non-dominated sets are initialized (S200). For example, an initial population could be created from a database or library of known tasks and resources. Initially, the stopping conditions are not satisfied (S210) so tournaments are set up (S220) as is known in the art. Tournaments are competitions between individuals to determine which is more likely to be a better solution to the problem at hand. A tournament could consist of a competition between two individuals but is not confined to two individuals. Tournament set up includes, for example, establishing which individuals will compete against each other in a manner consistent with identifying the most "fit" or best individuals in the current population. Next, rational tournament selection is applied for each tournament to determine which candidate is the better of the contestants (S240). This is illustrated in greater detail below in the example of FIGS. 3 and 4 and FIG. 5.

Figure 3:
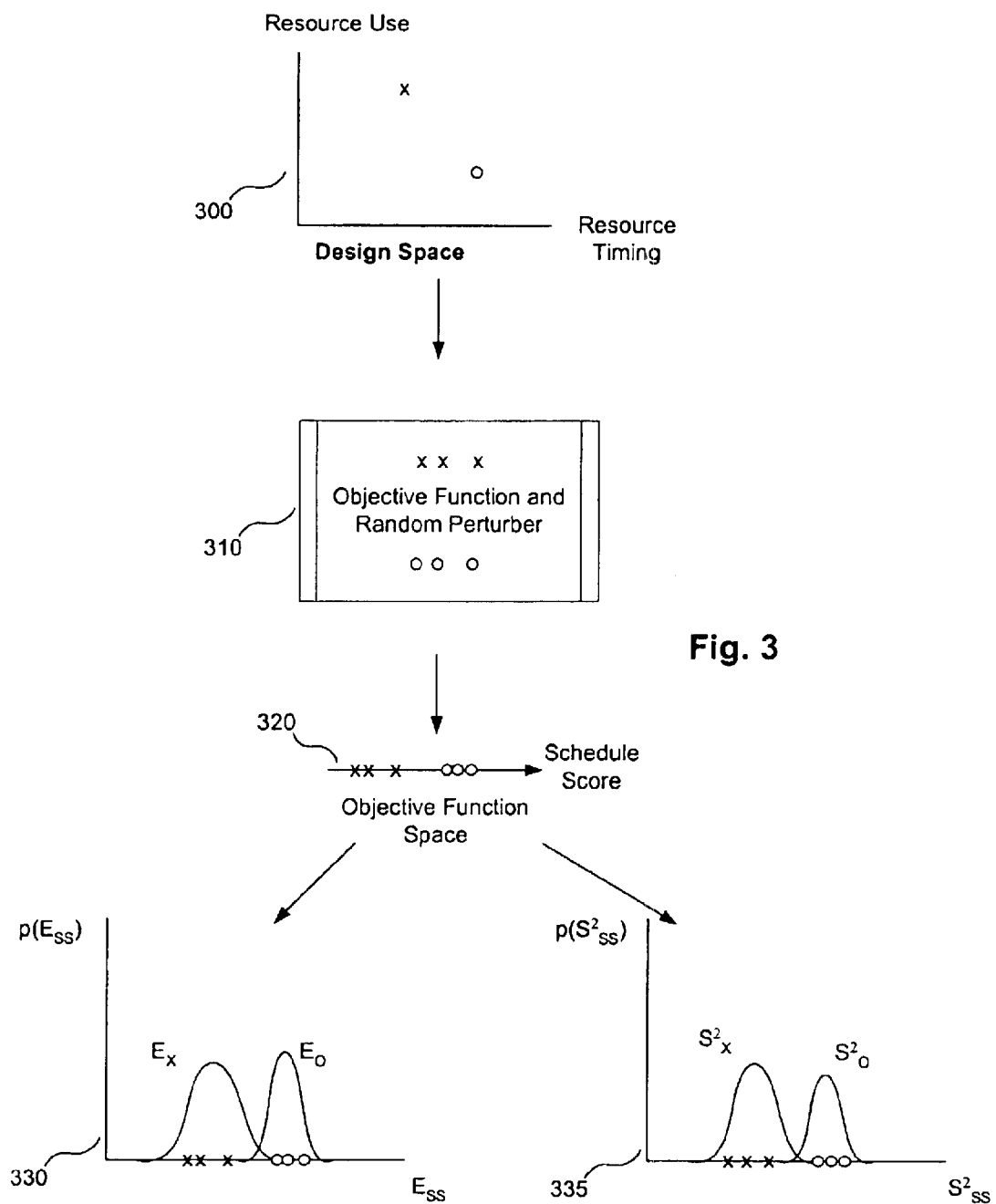
FIG. 3 is a schematic diagram illustrating an embodiment of the present invention applied to an example using a single objective function.
Figure 4:
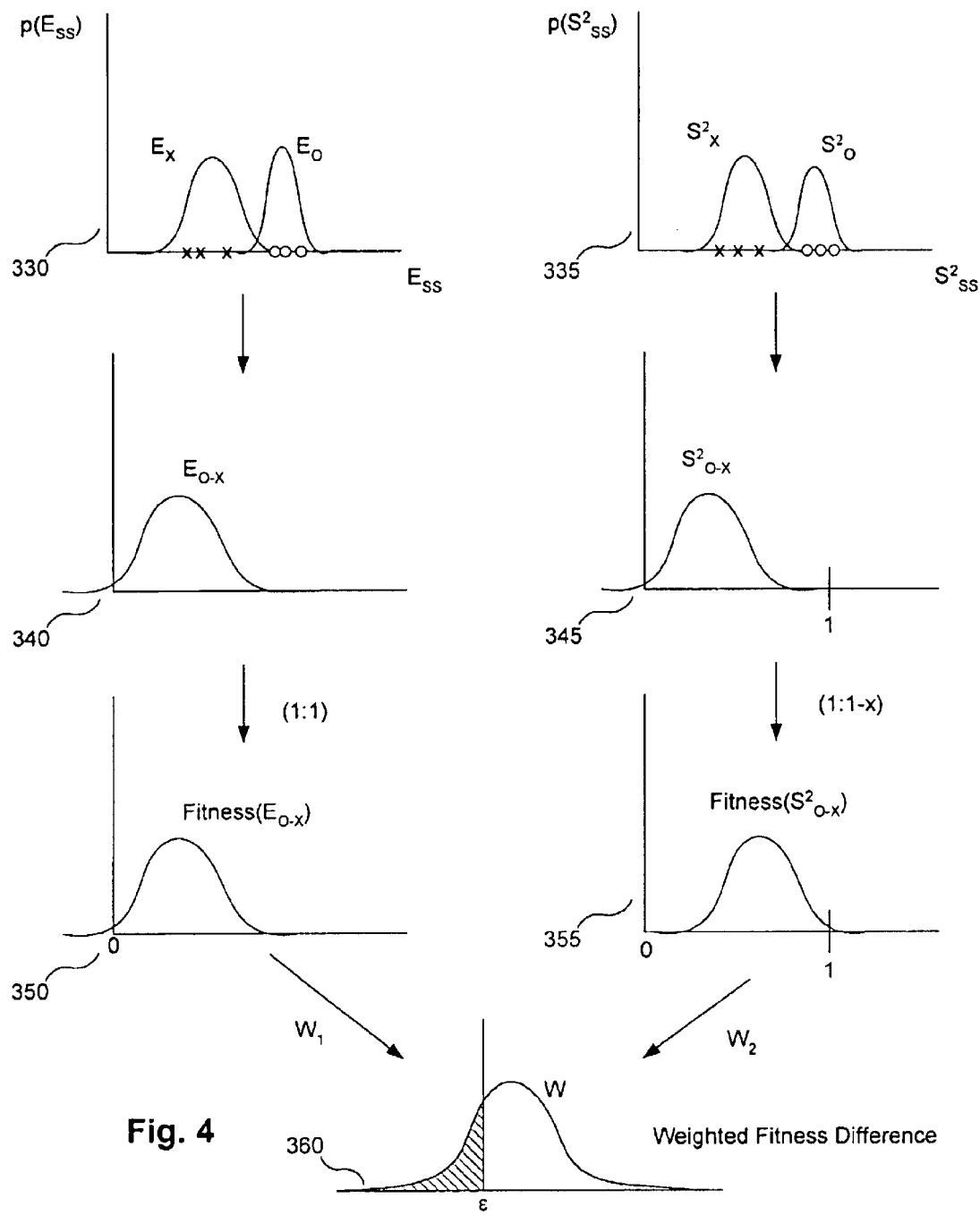
FIG. 4 is a continuation of the schematic diagram of FIG. 3.

A method of the present invention corresponding to the schematic of FIGS. 3 and 4 and illustrated in the chart of FIG. 2 can be summarized by the following high level pseudo code:

1. Establish an initial population of individuals;
2. Until a predetermined stopping condition is reached, repeatedly:
   Set up tournaments between individuals
   Determine tournament winners based on objective function values
   Set current population to be tournament winners
   Update non-dominated sets
   Add non-dominated sets to current population
   Vary current population;
3. Identify an individual having the best fitness as being a solution to the problem once the predetermined stopping condition has been reached.

Once tournament winners have been determined, they form the next generation of the population. However, not all losers will necessarily be excluded from subsequent generations of the population. Individuals that are not dominated, as discussed below, are included in non-dominated sets and some non-dominated individuals are injected into the population along with the tournament winners. The population is then varied by known methods such as mutation, Darwinian reproduction and crossover. Then the stopping conditions are tested again and another iteration is performed if they are not satisfied.

The step of rational tournament selection (S230) in FIG. 2 is amplified in FIG. 5, which will be described in greater detail below. In particular, the present invention relates to the selection of a candidate from, for example, two competing candidates by determining their fitness related scores and comparing them. Due to the stochastic nature of the problem, this comparison cannot be made directly and deterministically. Instead, statistical methods are employed. The present embodiment uses statistical measures or estimators of design quality such as sample means or sample variance and tests repeatedly to see if a required level of certainty has been achieved by the number of samples already taken before additional sampling is performed. In this way, unnecessary sampling, which can be very expensive in terms of computing resources, is reduced or minimized.

The example of FIGS. 3 and 4 conceptually illustrates an embodiment of the present invention in the context of a problem for the robust design of project schedule under uncertainty. A brief overview of the invention is presented with reference to these figures, followed by a more elaborate explanation of the details. FIGS. 3 and 4 illustrate an example in which the "better" candidate design is selected based on an objective function. The two points, denoted X and O, are points in design space. I.e. X and O are candidate designs. The "better" design is the one with the objective function value, in the present example, the higher schedule score. However, in order to have some confidence in the result, samples are taken for each candidate. A perturber is used to introduce stochastic variation in the objective function values associated with the samples.

Referring to FIG. 3, the first candidate, X, is sampled three times to determine three objective function values (i.e. schedule scores) denoted by the three Xs in the graph 320. Similarly, the second candidate O is sampled three times to determine three objective function values (i.e. schedule scores) denoted by the three Os in the graph 320. Next, referring to FIGS. 3 and 4, the statistical estimator mean schedule score is determined for each of candidates X and O. The corresponding first and second statistical estimator of design quality are denoted $E_X$ and $E_O$ in graph 330. These quantities are compared by the use of the difference function $E_{O-X}$ which is used to determine which candidate is to be selected.

Figure 14:
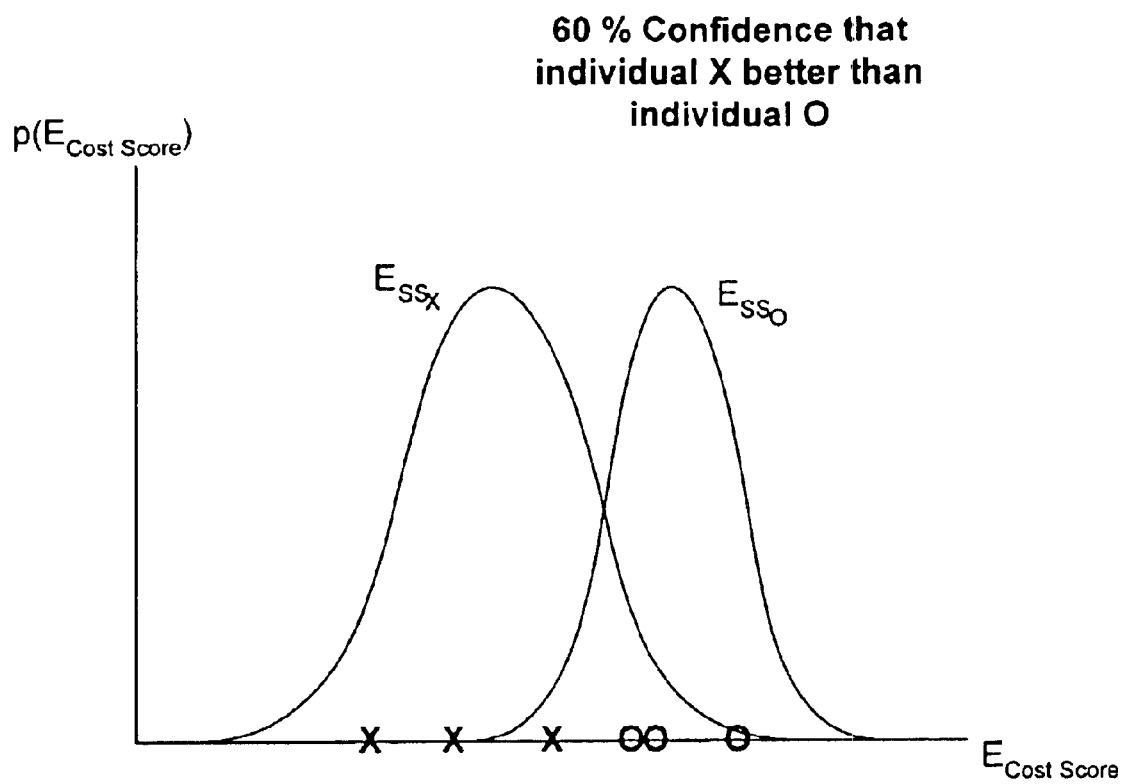
FIG. 14 illustrates an example comparison, according to an embodiment of the present invention, between two individuals after an initial three samples for each individual.
Figure 14:
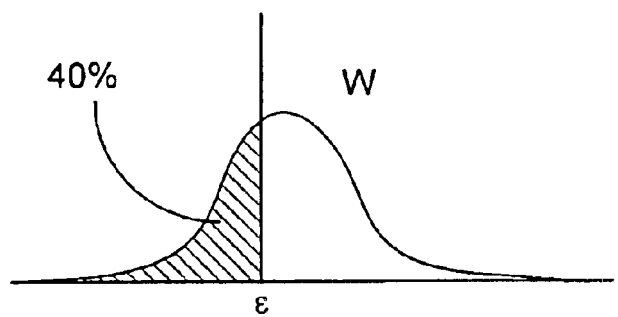
Figure 15:
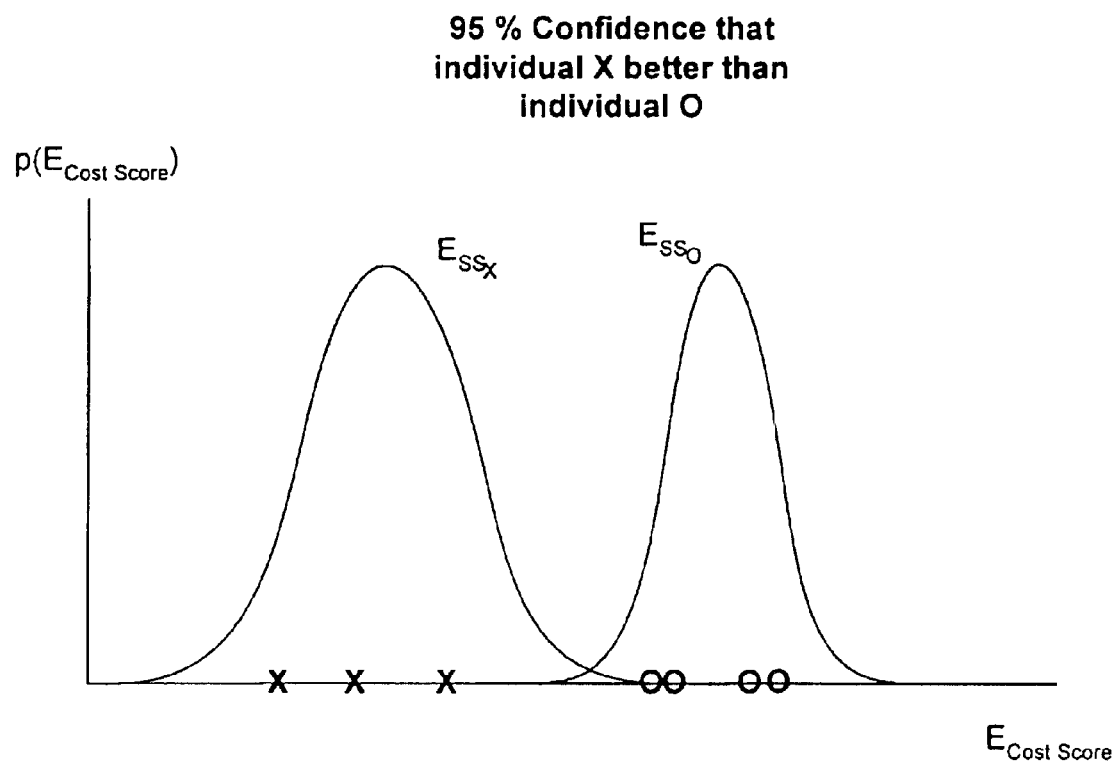
FIG. 15 illustrates the example of FIG. 14 after further sampling.
Figure 15:
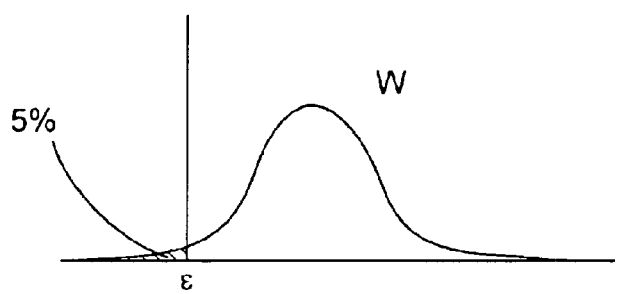

In the present example, another statistical estimator of quality, variance is also used. Thus corresponding variances $S^2_X$ and $S^2_O$ are obtained and used to determine a difference function $S^2_{O-X}$. Finally the difference functions are combined to obtain a weighted fitness function 360 which is used to determine whether a candidate can be selected with confidence. Note that two different sets of statistical estimators are used in this example. FIGS. 14 to 16 illustrate an example using only the statistical estimator mean schedule score (with corresponding first and second statistical estimators being mean schedule score for first and second candidates X and O respectively).

Referring to FIG. 3, there are two design variables, the use of resources (i.e. how resources are allocated to tasks over time), and the sets of start and stop times for each resource in each task. These variables form the basis of the design space (S300). In general, multiple objective functions (or an equivalent vector objective function) map points (i.e. individual design variables) in design space to objective function space. In the example of FIG. 3, the objective function is a single objective function that determines a schedule score associated with each design, the schedule score can be related to, for example, the makespan of the schedule or the cost. Because of the stochastic nature of the problem, a perturber is used to randomly introduce perturbations to the objective function values. FIG. 3 shows a combined objective function and random perturber (S310) which has been applied to three samples for each of two designs designated by X and O. In this example, two different estimators of design quality are used, sample mean of the schedule score and sample variance of the schedule score, denoted respectively by $E_{SS}$ and $S^2_{SS}$. The bottom two diagrams of FIG. 3 illustrate the probability distribution functions, $p(E_{SS})$ (S330) and $p(S^2_{SS})$ (S335), for sample mean and variance for each of schedules X and O.

These figures are repeated at the, top of FIG. 4 for convenient reference. Difference functions are then defined in a natural way followed by an artifice by way of a fitness function to determine a weighted fitness difference function. If the probability that the weighted difference is less than a tolerance $\epsilon$, there is sufficient confidence that a winner can be declared. At the top of FIG. 3, the two points labelled X and O represent individual schedules or designs. Typically, many such individuals or points are expected in the design space. These individuals are either members of the first generation of the population or a subsequent generation descended therefrom. The objective functions reflect desirable characteristics sought in a solution and necessary constraints imposed on the problem. For example, an objective function can relate to a single objective such as minimizing overall cost of a project. Alternatively, if there are multiple objectives such as minimizing cost while minimizing makespan, then multiple objective functions are used.

Figure 6:
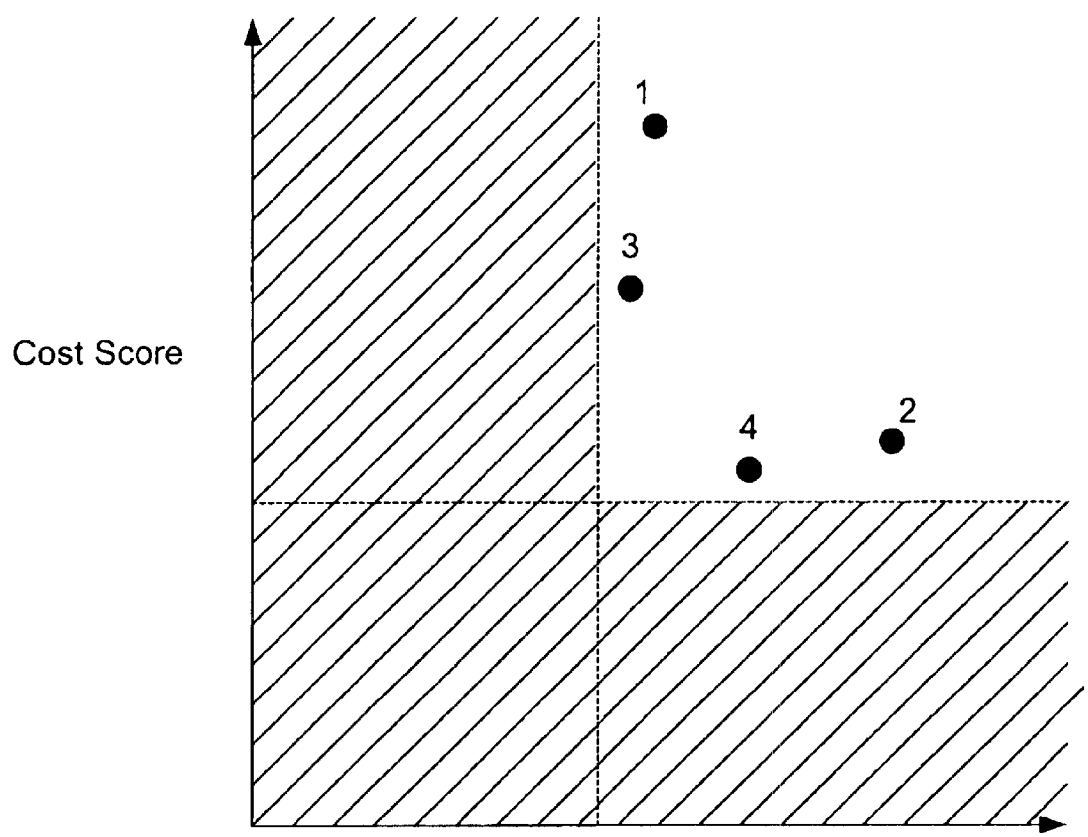
FIG. 6 is a diagram illustrating an example of the concept of trade off between two non-dominated individuals.

An important concept is that of trade-off between different constraints or goals. For example, the upper right quadrant of FIG. 6 illustrates the feasible region of acceptable solutions that meet certain minimum requirements for cost and makespan scores. Since the objective function seeks to minimize cost and makespan scores, it is clear that candidate 3 is better than candidate 1 since candidate 3 dominates candidate 1 (i.e. each of candidate 3's scores is at least as good as the corresponding score for candidate 1). Similarly candidate 4 is better than candidate 2. However, it cannot be deduced from FIG. 6 whether candidate 3 is better than candidate 4. One approach is to give unequal weight to the objective functions so that, for example, cost (i.e. cost score) is more important than makespan (i.e. makespan score). Of course, it is possible and may be desirable that both candidates 3 and 4 survive in the final population so that the designers are aware of this trade-off and are given the choice between the two schedules.

A point in design space (corresponding to a specific schedule) is a design typically with deterministic values and deterministic structural properties. The design could be evaluated by an objective function, typically with deterministic results. Since the example of FIGS. 3 and 4 relates to a stochastic problem, there must be a mechanism to reflect the uncertainty inherently associated with each point in design space.

Uncertainty can be introduced mathematically by random perturbations. For example, a probability distribution function can be used to describe the uncertainty or process variations associated with candidate designs. In the present embodiment illustrated in FIG. 3, a perturber (S310) introduces a random perturbation to the deterministic values normally associated with a design. Note that the objective function for cost may be a function of resource use and timing or it may include other variables relevant to the design problem. In addition, the perturber (S310) is not confined to introducing perturbations to design variables and can introduce perturbations to either aspects of the design, as discussed below, or to variables or parameters outside of design space.

Figure 7:
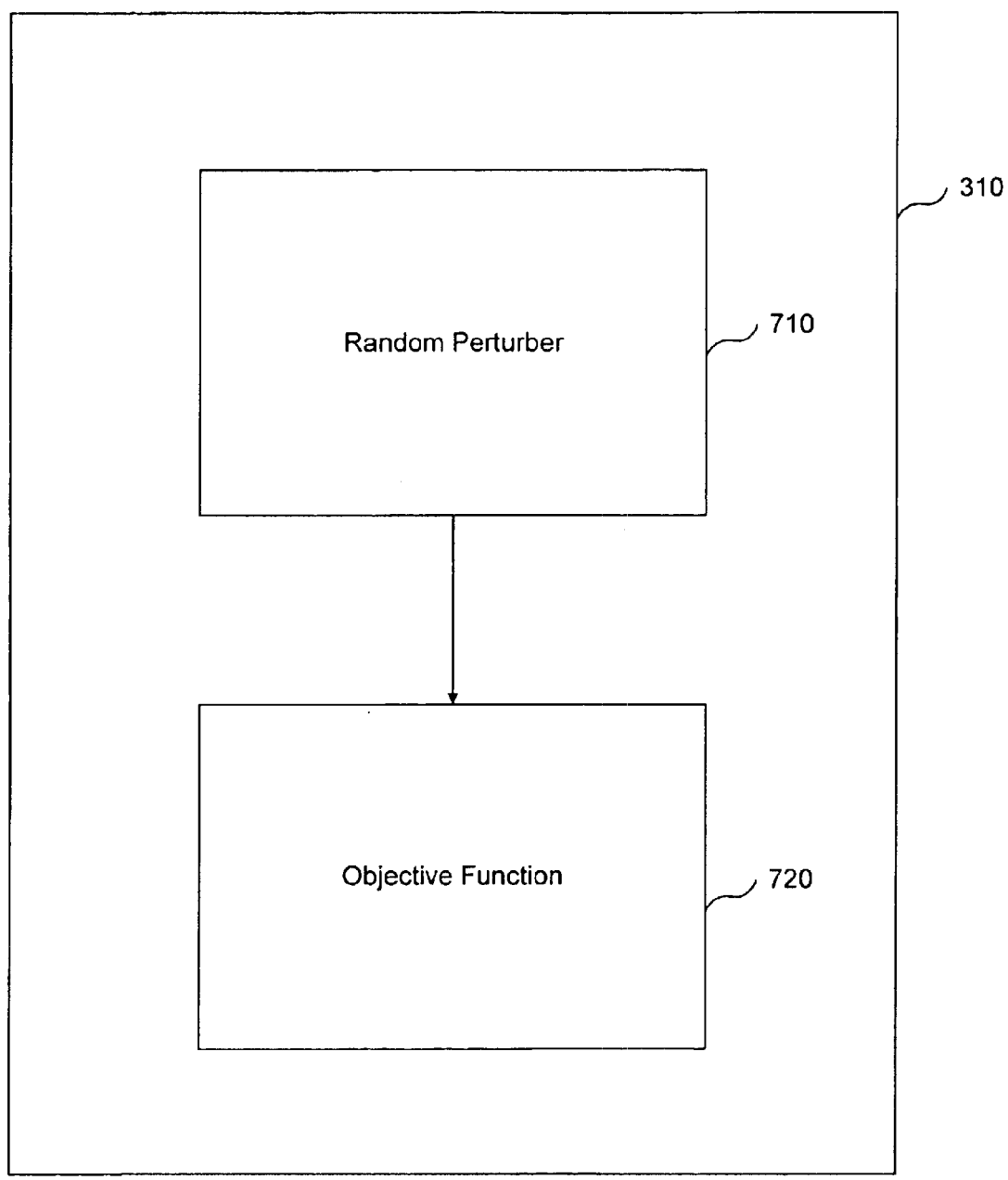
FIG. 7 is a schematic diagram illustrating an embodiment of the objective function and random perturber of FIG. 3.
Figure 8:
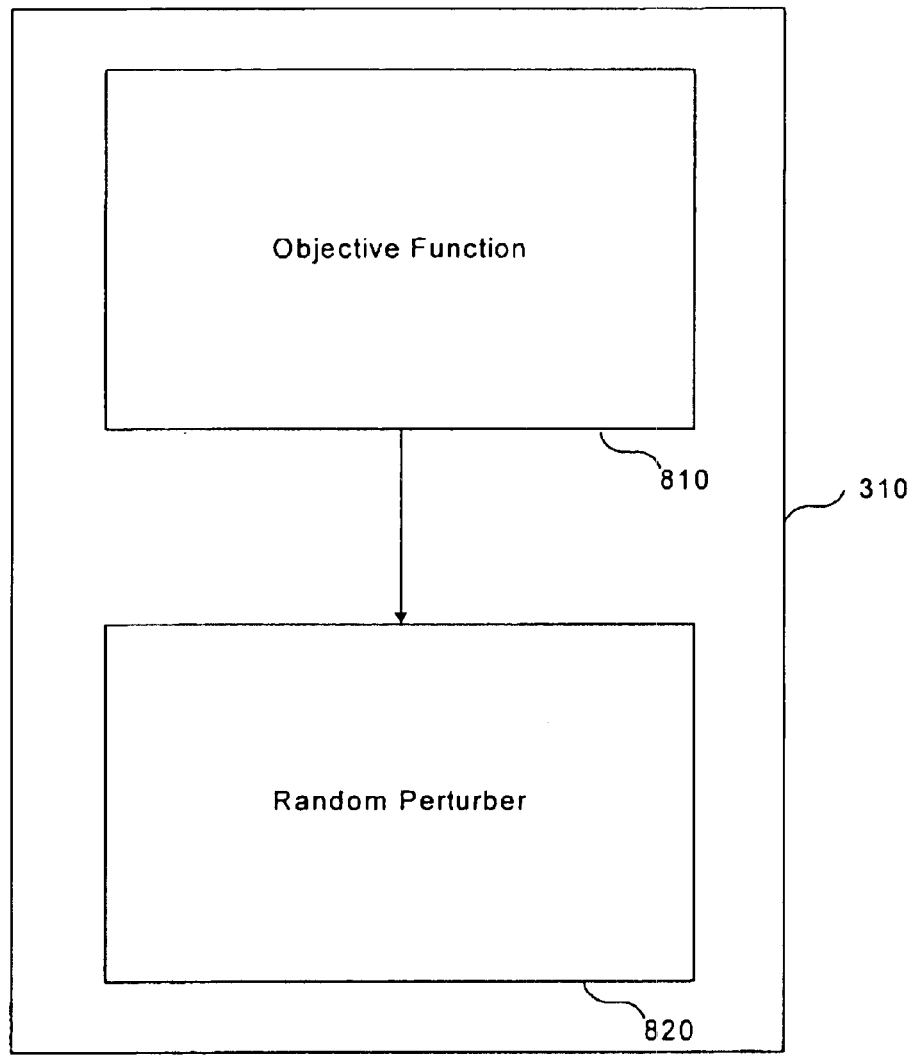
FIG. 8 is a schematic diagram illustrating an alternative embodiment of the objective function and random perturber of FIG. 3.

FIG. 7 illustrates an example configuration of the objective function and random perturber (S310) of FIG. 3. The perturber (S710) of FIG. 7 maps a deterministic schedule space (a superset of design space that includes design variables of schedules) to a modified schedule space, which models the stochastic nature of unpredictable variations occurring during task completion. The objective functions (S720) then maps the modified schedule space to objective function space. However it is also possible to use other approaches. For example, it is also possible to introduce perturbations via perturber (S820) after the evaluation of objective functions (S810) as illustrated in FIG. 8. The embodiment of FIG. 8 can, for example, be used to model noise in the measurement of objective functions such as from an imperfect time tracker.

Figure 10:
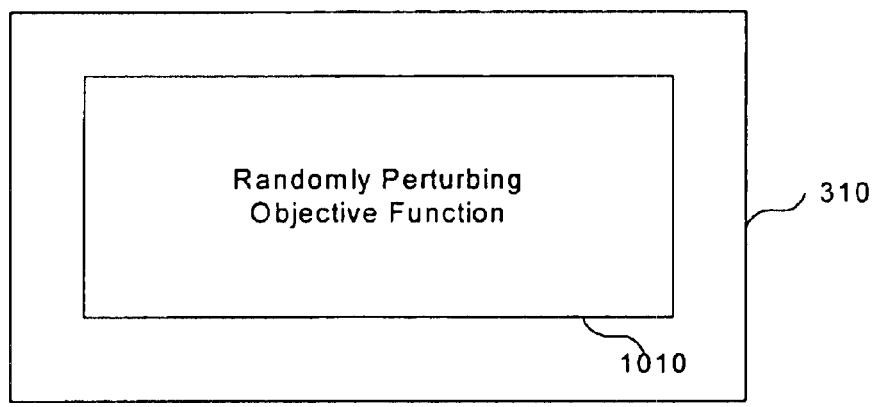
FIG. 10 is a schematic diagram illustrating a further embodiment of the objective function and random perturber of FIG. 3.
Figure 9:
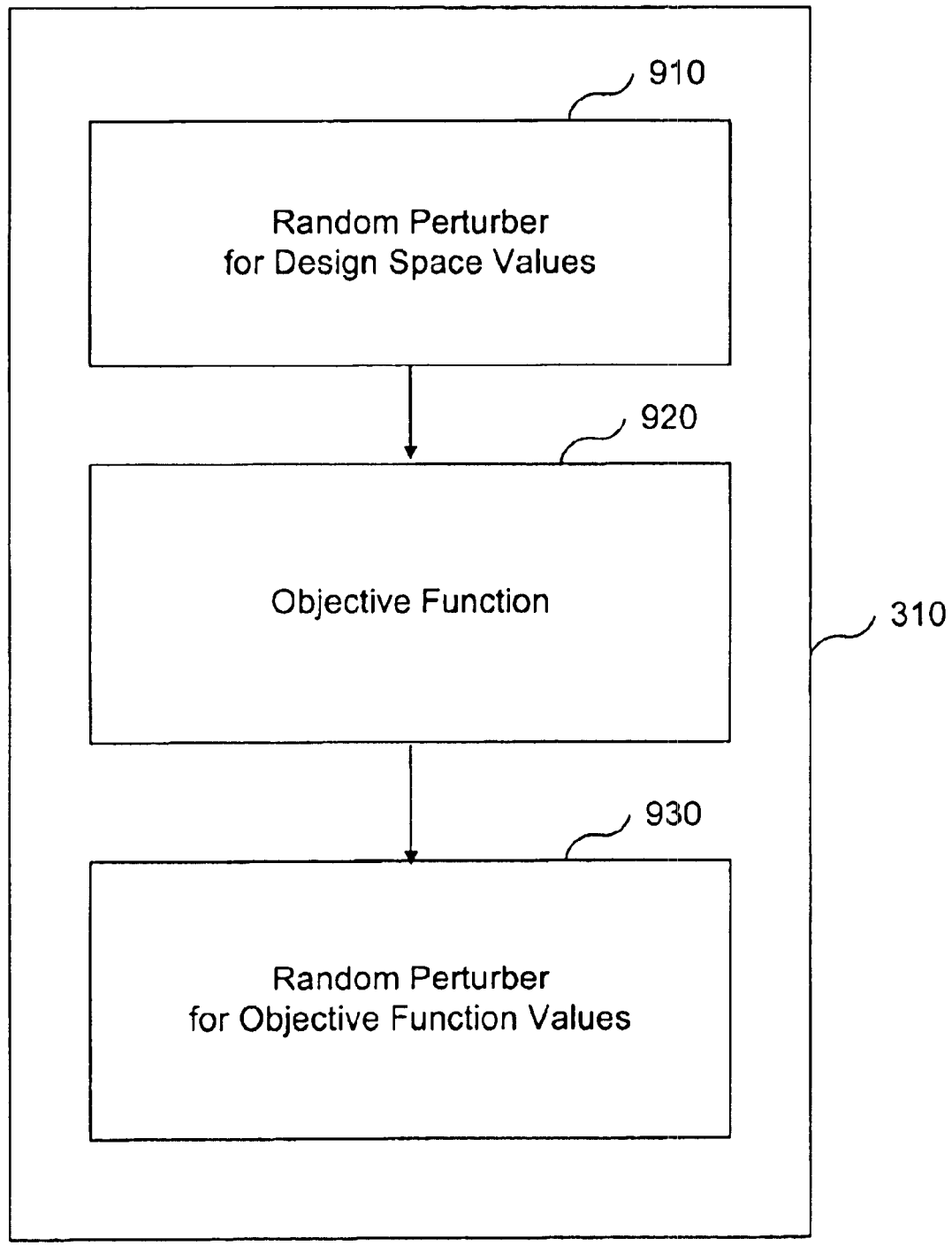
FIG. 9 is a schematic diagram illustrating another embodiment of the objective function and random perturber of FIG. 3.

As illustrated in FIG. 9, an alternative approach is to use objective functions (S920) that map design space values perturbed by a perturber (S910) and then apply a perturber (S930) which maps the objective function space to a modified objective function space. Of course, it is also possible to have a single stochastic objective function (S1010) that maps from a deterministic schedule space to an objective function space as illustrated in FIG. 10. In order to simplify notation, "d" denotes all the design variables of design space. For example, if the design variables are resource use d1 and task timing d2 then d denotes the vector consisting of (d1, d2).

Referring back to FIG. 3, the perturber models the unpredictability in the time it takes a resource to complete a task, and the likelihood that a resource will be unavailable due to unpredictable factors such as employee absenteeism or machine breakdown. The perturber (S310) of FIG. 3 can introduce perturbations by varying the values of design variables. In such a case, the perturbations introduced by the perturber (S310) of FIG. 3 to a design variable d can be represented by a quantity $\Delta d$ so that the objective functions operate on $d+\Delta d$. Thus objective function $\phi$ or objective functions $\phi_i$ operate on $d+\Delta d$ instead of d (i.e. $\phi(d+\Delta d)$ or $\phi_i(d+\Delta d)$). If there are n design variables then d is an n-dimensional vector and, of course, if there is only a single design variable then n=1 and d is a one dimensional vector or scalar. Similarly, $\phi$ denotes either a scalar objective function or an n-dimensional vector objective function consisting of multiple objective functions $\phi_1, \ldots, \phi_n$. Whether $\phi$ is a scalar or vector function will be clear from the context.

Of course, the perturbations need not be linear or even continuous as illustrated in the example of a perturber, which includes a 1% probability of removing a specific task or a task chosen at random. Such a change is not within the design space of varying resource use and task timing, but is likely to have a substantial impact on the functionality of the resulting schedule, including cost and makespan. For the purposes of illustration, however, it is assumed that a perturber is mathematically "well behaved", as exemplified by the familiar example of a Gaussian distribution.

Because of the stochastic nature of the problem, there is a need to take multiple samples for each individual. The computation intensive nature of the calculations needed to build a data point in performance space means that the step of determining a tournament winner can consume a significant amount of computing resources and can be a limiting factor in the method. As discussed above, it is known to use "brute force" Monte Carlo to conduct a predetermined number of runs, say 50, to determine with near statistical certainty representative objective function values associated with the competing individuals in a tournament and determine the winner.

To make comparisons between individuals for the purpose of determining tournament winners, the objective function values, illustrated in the objective function space (S320) of FIG. 3 are used. The example of FIG. 3 corresponds to a single-objective function but, of course, a higher dimensional performance space can be used in the case of multiple objective functions. To meaningfully compare the objective function values obtained by each individual, statistical estimators of design quality are used. The example of FIGS. 3 and 4 use sample mean of the schedule score and sample variance of the schedule score denoted respectively by $E_{SS}$ and $S^2_{SS}$. Thus $E_{SSx}$ refers to the sample mean schedule score based on the samples for individual X. $S^2_{SSx}$ refers to the sample variance for the sample for X. $E_{SSo}$ and $S^2_{SSo}$ denote the corresponding counterparts for individual O.

Using basic statistics it is possible, for example, to determine the probability of different values of $E_{SSx}$ resulting in the probability distribution function $E_X$. Similarly, it is possible to determine $E_Y$ and $S^2_X$ and $S^2_Y$. These are illustrated by graphs (S330) and (S335) at the bottom of FIG. 3 and the top of FIG. 4. Next define $E_{O-X}$ as $E_O-E_X$ (see graph S340). Note that in the present example it is clear which function should be subtracted from the other. In general, however, it may be necessary or desirable to consider a corresponding probability distribution function $E_{X-O}$ as well and utilize that function in a symmetrical way to ensure that both possibilities (i.e. X is winner and O is winner) are examined. Similarly define $S^2_{O-X}$ as $S^2_O-S^2_X$ (see S345). Note that while it is desired to determine the individual having the largest sample mean schedule score, it is also desired to determine the individual having the lowest sample variance in schedule score. Accordingly, a fitness function which acts on probability distribution function X can be used. In general a fitness function F(X) transforms the statistical estimator of schedule quality X, such that only maximum values need to be identified. For example, whereas it is desired to maximize partial yield, it is also desired to minimize sample variance. Accordingly, a fitness function F is used, such that all functions maximized. One example fitness function is given by:

$F(X)=X$, if $X$=sample mean or partial yield $F(X)=1-X$, if $X$=variance.

The fitness transformed functions $F(E_{O-X})$ (S350) and $F(S^2_{O-X})$ (S355) are illustrated in FIG. 4. Of course, this is an example fitness function suitable for the example of FIG. 4 but other fitness functions exist. Next, define a weighted fitness difference $W=w_1 \cdot F(E_{O-X})+w_2 \cdot F(S^2_{O-X})$ where $w_1$ and $w_2$ are weights that can, for example, be set to reflect the relative importance of mean schedule score and variance in schedule score in determining the winner of the tournament. The PDF W is illustrated at the bottom of FIG. 4 (see graph 310). For tolerance $\epsilon>0$, the probability that $W \leq 0$ (i.e. the area (S360) under W that is left of $\epsilon$) is determined, and if it is less than tolerance $\tau$ (as discussed below) then O is declared to be the winner. The use of a fitness function introduces a convenient artifice allowing a quantity to be maximized when dealing with sample variance (which one would normally seek to minimize). In later examples, to avoid unnecessary detail, the use of the fitness function is omitted. Instead, the difference functions are used directly to get the weighted fitness difference W whenever possible.

In the present example, the case where tournaments are conducted between two individuals who compete on the basis of objective function values is discussed. The method of the present invention, however, is not restricted to tournaments between two individuals and could easily adapted to tournaments having three or more competitors.

According to the example pseudo-code of FIG. 2, individuals in the population are randomly chosen to participate in tournaments. If two individuals are identical then it does not matter which individual is selected as the winner and the winner can be selected arbitrarily. If they are not identical then the individuals are sampled and the results are compared to determine whether a winner can be established based on fitness at a desired level of confidence.

The degree of statistical confidence is reflected in the value of probability tolerance $\tau$. The probability tolerance $\tau$ represents the amount of uncertainty that can be tolerated when a winner is selected. For example, if this value is set to 0.001 then when a winner is selected from two candidates in a tournament, the certainty is $1-\tau$ (i.e. 99.9%) that the winner is at least as fit (on average) as the losing candidate. Probability tolerance $\tau$ can be a predetermined number established beforehand to determine when enough samples have been taken. However, it is also fully contemplated that probability tolerance $\tau$ can, in other embodiments, be changed dynamically for example according to time or in response to other factors.

In order to limit the result to meaningful differences, the present invention requires that the differences between the results be not less than an error tolerance, $\epsilon$. Thus, in the example of FIGS. 3 and 4, individual X is chosen as the winner over individual O if there is statistical confidence that the mean fitness of individual X is greater than the mean fitness of individual O by at least $\epsilon$. For example, if the error tolerance is set to a predetermined value of 0.001 then no winner will be selected if, at the level of certainty of $1-\tau$, the objective function values of two candidates differ only by 0.0005 which is insignificant whereas a difference of 0.0015 will be considered significant. It is possible to set the error tolerance to 0 if objective function values of candidates are expected to be close to each other or if the maximum number of samples has been reached and no winner has yet been found. The error tolerance can also be selected based on the problem being investigated. However, it need not necessarily be predetermined and may be changed dynamically during runtime by the algorithm itself if that is desired.

Figure 5:
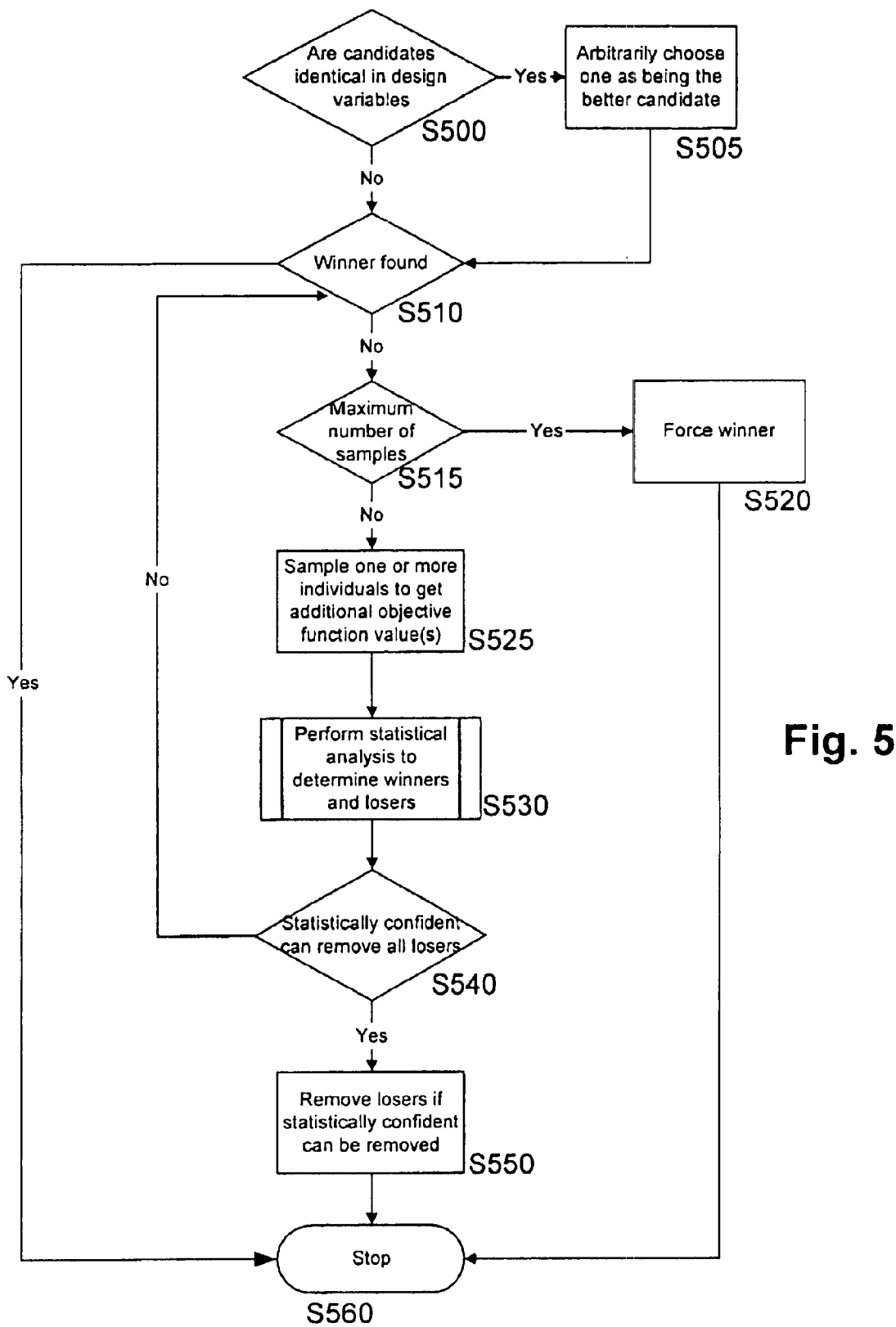
FIG. 5 is a flowchart illustrating the details of the step of applying rational tournament selection as indicated in FIG. 2.

The detailed method of determining tournament winners based on objective function values is illustrated in FIG. 5 and can be summarized by the following pseudo code:

1. Determine if candidates are identical in design variables (S500). If so, arbitrarily choose one as the winner (S505).
2. If a winner is found then stop (S550).
3. Determine if the maximum number of samples has been exceeded. If so, force a winner (S520).
4. If not, sample one or more individuals to get (additional) objective function values (S525).
5. Perform statistical analysis on samples to determine winners and losers (S530).
6. Update certainties of at least one individual winning or losing to others (S530).
7. Remove losers if statistically confident that they can be removed otherwise go to step S510.

Figure 11:
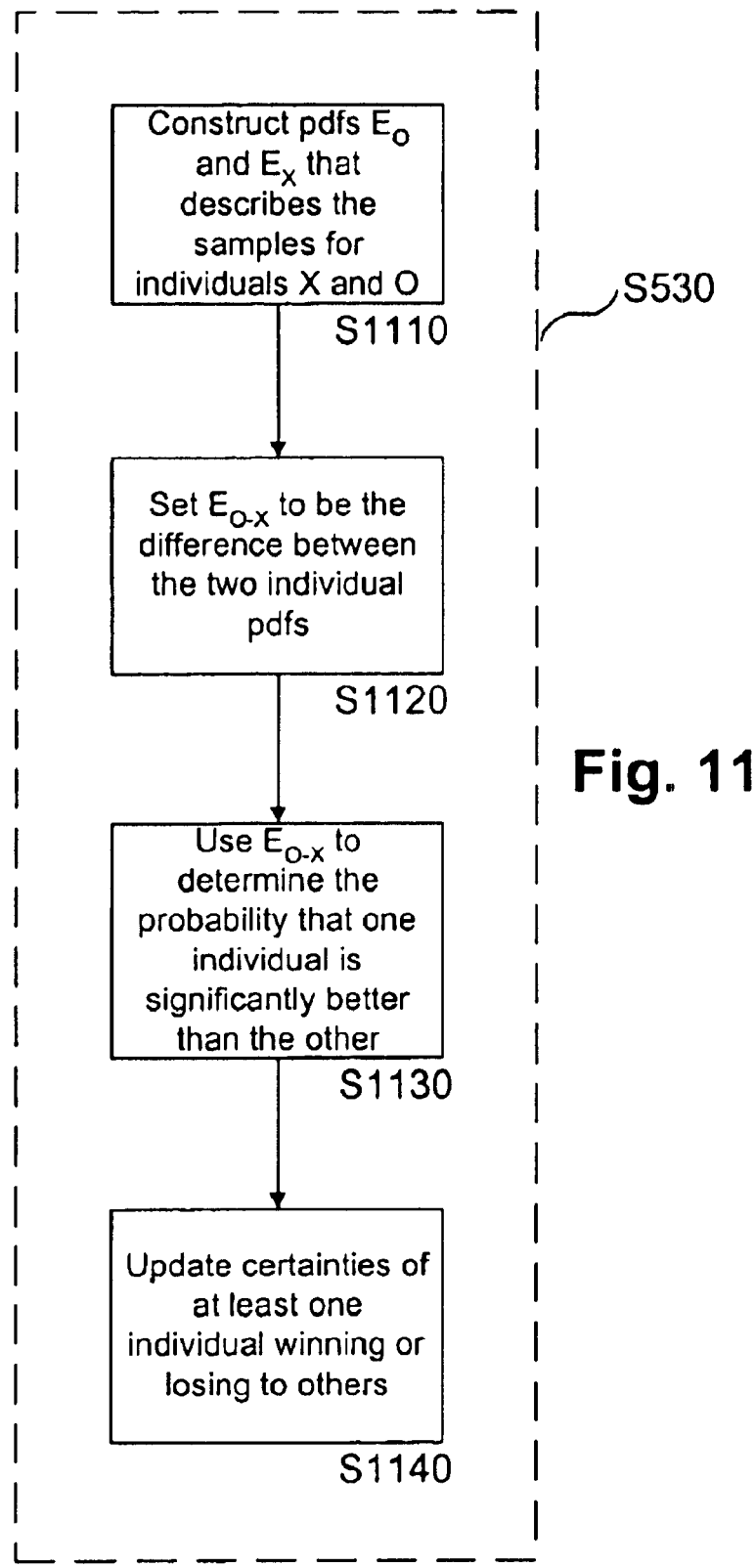
FIG. 11 is a flowchart illustrating the details of the step of performing statistical analysis to determine winners as indicated in FIG. 5.
Figure 12:
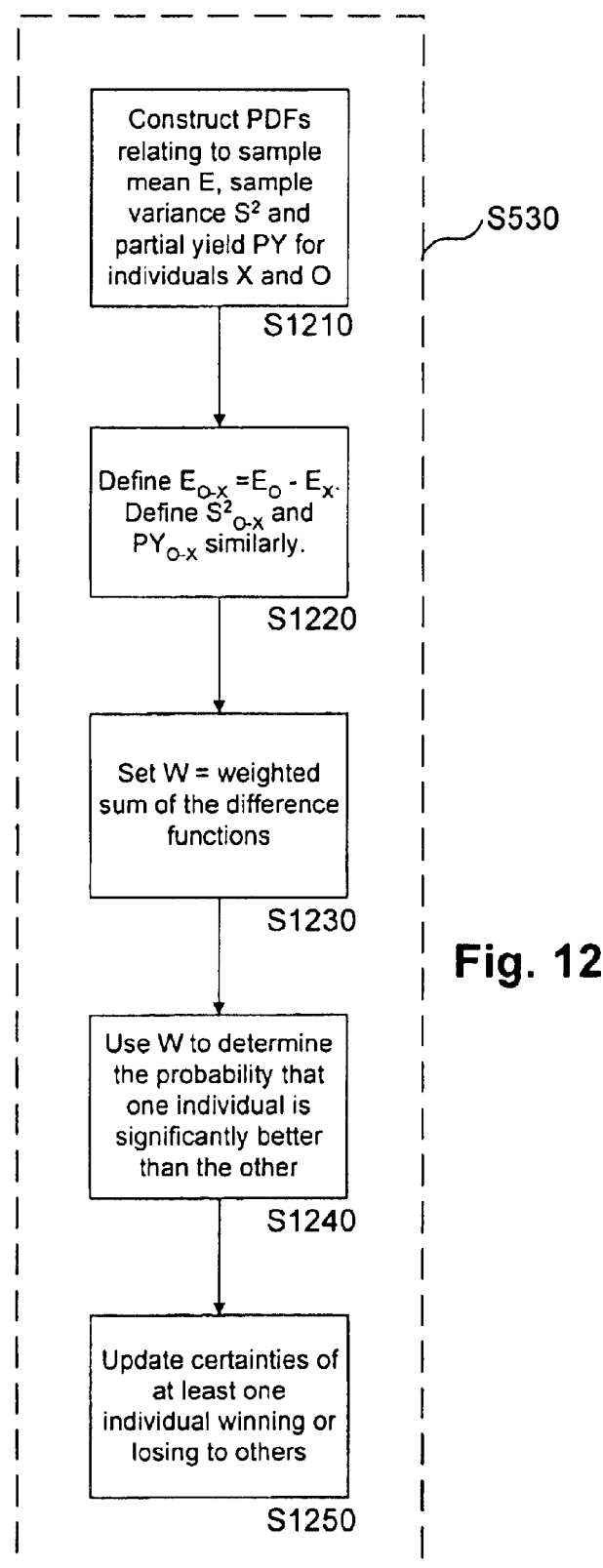
FIG. 12 is a is a flowchart illustrating the details of the step of performing statistical analysis to determine winners as indicated in FIG. 5 according to an alternative embodiment.
Figure 13:
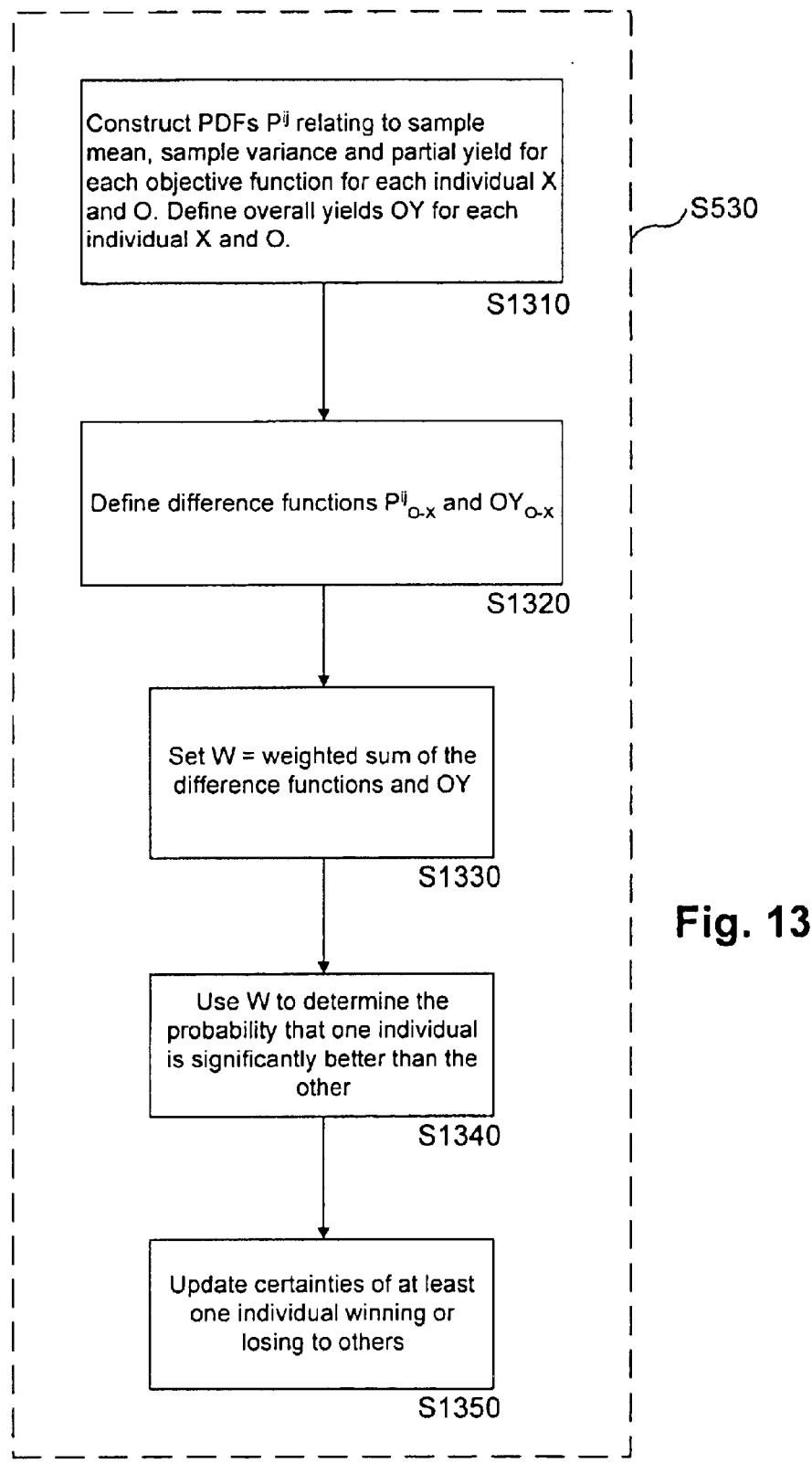
FIG. 13 is a is a flowchart illustrating the details of the step of performing statistical analysis to determine winners as indicated in FIG. 5 according to another embodiment.

FIGS. 11 to 13 provide details of the step S530 of statistical analysis of FIG. 5 according to different embodiments. The statistical analysis of FIG. 11 provides details of the step of performing statistical analysis to determine winners and losers of FIG. 5. The statistical analysis includes the steps indicated by the following pseudo-code directed to an example involving two individual schedules X and O, a single objective function and a single statistical estimator of design quality:

1. For each individual X and O, use the sample mean and standard error to construct a probability distribution function. Denote these probability distribution functions by $E_O$ and $E_X$. (see S1110)
2. Define $E_{O-X}$ to be the difference between the two individual probability distribution functions: $E_{O-X}=E_O-E_X$. (see S1120)
3. Use distribution $E_{O-X}$ to determine the probability that one individual is significantly better than the other (see discussion of W in FIGS. 3 and 4). (see S1130)

4. Update certainties of at least one individual winning or losing to others. (see S51140)

In the examples, O is better than X, i.e. on average O is more fit than X, and the method of the present invention can be illustrated by subtracting the values associated with individual X from the corresponding values associated with individual O. However, as is apparent to a person skilled in the art, in a practical implementation of the present invention, both the results corresponding to X–O and O–X may need to be examined. For example, an alternative function $E_{X-O}$ may be defined in a manner similar to that illustrated for $E_{O-X}$.

The statistical analysis of FIG. 12 includes the steps indicated by the following pseudo code relating to an example with one objective function and three statistical estimators of design quality, namely, mean, variance and partial yield (PY):

1. From the sample for individual X, use the sample mean and standard error to construct probability distribution functions (PDFs) relating $E_X$ describing the probability distribution of the true mean value for X. Similarly construct probability distribution functions relating to variance and partial yield: $S^2_X$. Determine similar PDFs for individual O. (see S1210)
2. Define $E_{O-X}$ to be $E_O - E_X$. Define $S^2_{O-X}$ and $PY_{O-X}$ analogously. (see S1220)
3. Set W to be the weighted sum of difference functions: $W = w_1 \cdot E_{O-X} + w_2 \cdot S^2_{O-X} + w_3 \cdot PY_{O-X}$, where $w_i$, $1 \leq i \leq 3$ are weights. (see S1230)
4. Use distribution W to determine the probability that one individual is significantly better than the other. (see S1240)
5. Update certainties of at least one individual winning or losing to others. (see S1250)

The statistical analysis of FIG. 13 includes the steps indicated by the following pseudo code relating to an example with two objective functions and four statistical estimators of design quality:

1. From the sample for individual X, use the sample mean and standard error to construct probability distribution functions (PDFs) relating to the sample mean, sample variances and partial yields for the two objective functions. Construct similar PDFs for individual O. Denote these PDFs $P^{ij}_X$ and $P^{ij}_O$, $1 \leq i \leq 2$; $1 \leq j \leq 3$ for example, $P^{11}_X = E1_X$; $P^{12}_X = E2_X$; $P^{21}_X = S1^2_X$, $P^{31}_X = PY^1_X$ etc. where $E1_X$ is the sample mean for individual X relating to the first objective function, $S1^2_X$ is the sample variance for individual X relating to the first objective function, $PY^1_X$ is the partial yield for the samples from individual X relating to the first objective function. Define $OY_X$ to be the overall yields of the for individual X and similarly for $OY_O$ for individual O. (see S1310)
2. Define $P^{ij}_{O-X}$ to be $P^{ij}_O - P^{ij}_X$ for $1 \leq i \leq 2$, $1 \leq j \leq 3$. Define $OY_O - OY_X$ (see S1320)
3. Set W to be the weighted sum of differences functions: $W = \Sigma\Sigma w_{ij} \cdot P^{ij}_{O-X} + w' \cdot OY_{O-X}$. The coefficients $w_{ij}$ and $w'$ are weights ascribed to the different terms. (see S1330)
4. Use distribution W to determine the probability that one individual is significantly better than the other. (see S1340)
5. Update certainties of at least one individual winning or losing to others. (see S1350)

FIG. 14 illustrates an embodiment of the invention by the use of an example in which a parameter search engine is applied to a stochastic problem in the design of schedules. In this example, a 98% statistical confidence is required (corresponding to $\tau = 0.02$) and each individual is initially sampled three times. The design variables are resource use d1 and resource timing d2 and a single scalar objective function $\phi(d1,d2)$ represents the cost score. The example of FIG. 14 illustrates how an embodiment of the invention is used to determine the winner in a tournament having two individuals identified as X and O. The statistical estimate of design quality potential is to minimize mean cost score $E_{CostScore}$ In other words, the design or designs having the smallest mean cost scores are the best designs. Note, however, that many other statistical estimates are possible for design quality. For example, instead of minimizing expected or mean cost score one could seek to minimize variance in the cost score or optimize makespan.

In the present example of FIG. 12a Gaussian distribution will be used for illustration purposes but other distributions are also possible. Since the problem is stochastic there is no cost score inherently associated with an individual such as individual X. Instead, individual X has an average or mean cost score which is unknown and must be estimated by statistical sampling.

In FIG. 14, individuals X and O each have three initial sample cost scores indicated respectively along the absicissa by "X"s and "O"s. Since each of individual O's sample cost scores (objective function values) is less than any of individual O's sample cost scores, it is clearly expected that individual O will win the tournament. There is, however, a chance that individual X actually has a larger mean objective function value than individual O and that the observed results are due to errors arising from sampling. In other words, the null hypothesis is that individual O has a larger average cost score than individual X.

Assuming that a Gaussian probability distribution function can be used to describe the randomness of the cost score, elementary statistics can be used to compute a sample mean $E_{CS_O}$ and the standard error of the sample mean $SE_O$ from the three sample cost scores for individual O and determine a corresponding probability distribution $E_{CS_O}$ as illustrated in the upper half of FIG. 14. In other words, $E_{CS_O}$ is a Gaussian probability distribution function having mean and standard deviation equal to the sample mean and standard error of sample mean of the three samples for individual X. Similarly, the three samples for individual X can be used to determine $E_{CS_X}$. Note that the probability distribution function is Gaussian for the purposes of the present example but other probability distribution functions, such as uniform probability distribution, Poisson distribution, etc. are possible.

In a manner similar to the discussion with reference to FIGS. 3 and 4, new probability distribution functions Fitness ($E_{CS_O}$) and Fitness($E_{CS_X}$) and a weighted probability difference function W are defined. Here, the weights are equal and W=Fitness($E_{CS_O}$)–Fitness($E_{CS_X}$). The function W is illustrated in the lower half of FIG. 14. The unshaded area under the curve (to the right of the ordinate) indicates the expected probability: that individual X has an average cost score that is less than the average cost score of individual O (the null hypothesis). The shaded area under the curve (to the left of the ordinate) indicates the probability that individual X has an average cost score that is greater than the average cost score of individual Y (the alternative hypothesis).

As shown in FIG. 14, the shaded area represents a 40% chance that the null hypothesis is false. Since in this example, only a 2% uncertainty ($\tau = 0.02$) can be tolerated, additional sampling is required. The example of FIG. 14 is further illustrated in FIGS. 15 and 16 with additional samples being added in increments of one. Individuals X and O are alternately sampled starting arbitrarily with individual O in this example. However, it is also possible to use other techniques to choose which individual is sampled next, for example, by choosing to sample the individual with the smallest number of samples or the individual with the highest variance in objective function results. Since a confidence of 98% is required, there is further sampling, as illustrated in FIG. 15, to bring the total number of samples for individual O to four. Computation of the statistical quantities such as sample mean and sample variance are done again based on the four samples for individual O and the corresponding probability distribution function $E_{CSo}$ is determined. The corresponding weighted probability difference function is denoted by W and is illustrated in the bottom half of FIG. 15. Note that W is based on seven samples whereas previously in FIG. 14 it was based on 6 samples.

As indicated in FIG. 15, this results in a 95% confidence that the individual O is more fit: not enough. Another sample is then taken for individual X as illustrated in FIG. 16. The resulting confidence level of 99% is sufficient and individual O is declared the winner of the tournament. Note that the minimum amount of sampling and computational effort that is consistent with the required level of confidence is expended. In this example, a winner of the tournament could be determined after taking only 8 samples. The present embodiment, however, includes a limit to the total number of samples, for example 50 samples, to ensure that a winner will be determined within defined limits on time and computing resources. If no winner is determined after the maximum number of samples then a winner is forced. This can be done by comparing the objective function values without requiring that they differ by a minimum error tolerance (i.e. use $\epsilon=0$) so that objective function values of the winner and the loser may only be separated by a small amount. If the objective function values are identical then a tie-break can be used, for example, by arbitrarily choosing one as the winner or a rational criterion such as choosing an individual schedule with a shorter makespan.

In the above example, there are initially three samples per candidate followed by additional samples in single sample increments. Single sample increments give the finest granularity and ensure that no unnecessary sampling is required. It may, however, be desirable to select a greater increment or a larger number of initial samples if a model has candidates whose values do not converge quickly to a decision. Of course, the initial number of samples need not be three and any suitable initial sample size can be chosen, for example, one initial sample.

Figure 17:
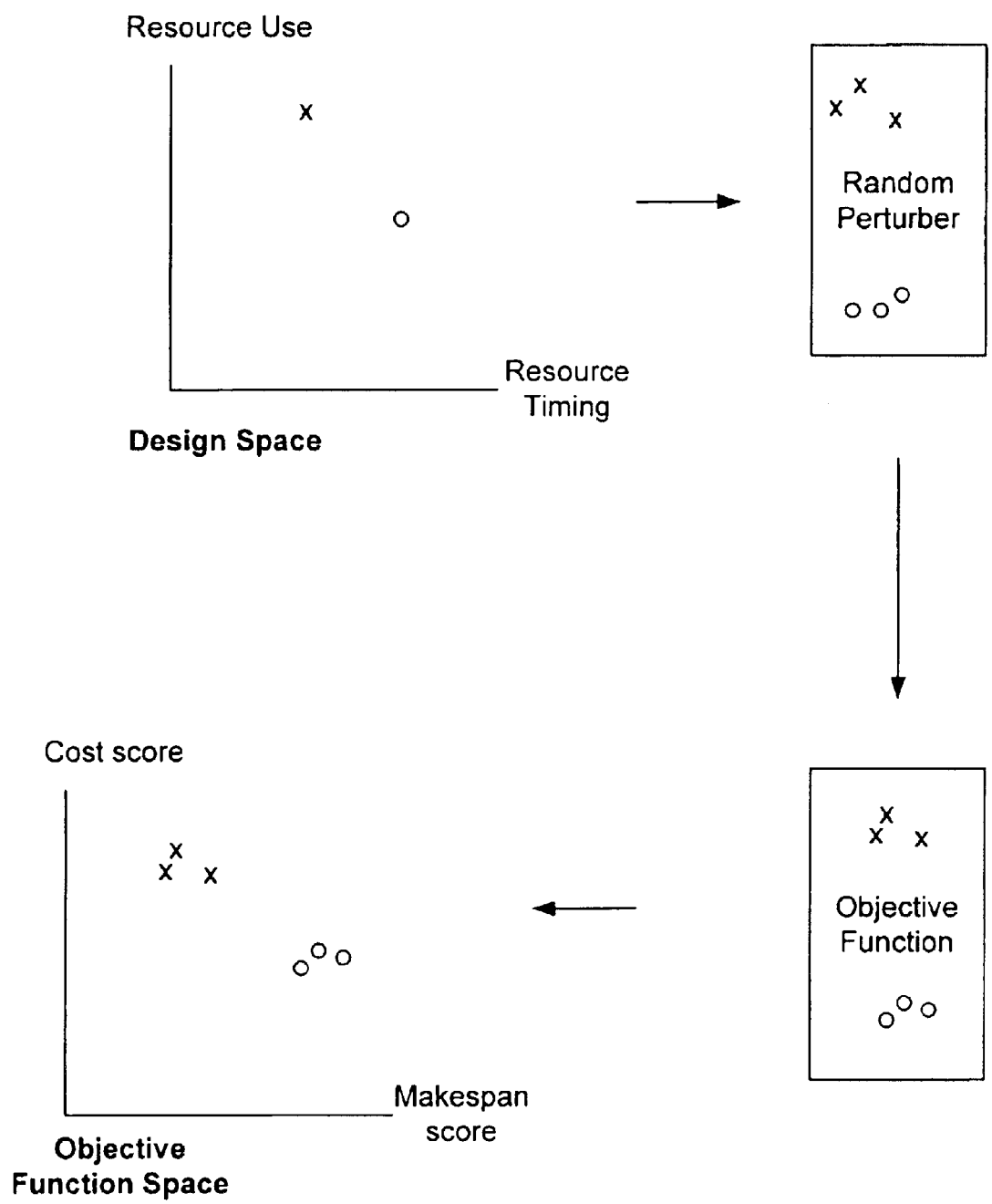
FIG. 17 is a schematic diagram illustrating a further embodiment of the present invention applied to an example using multiple objective functions.
Figure 18:
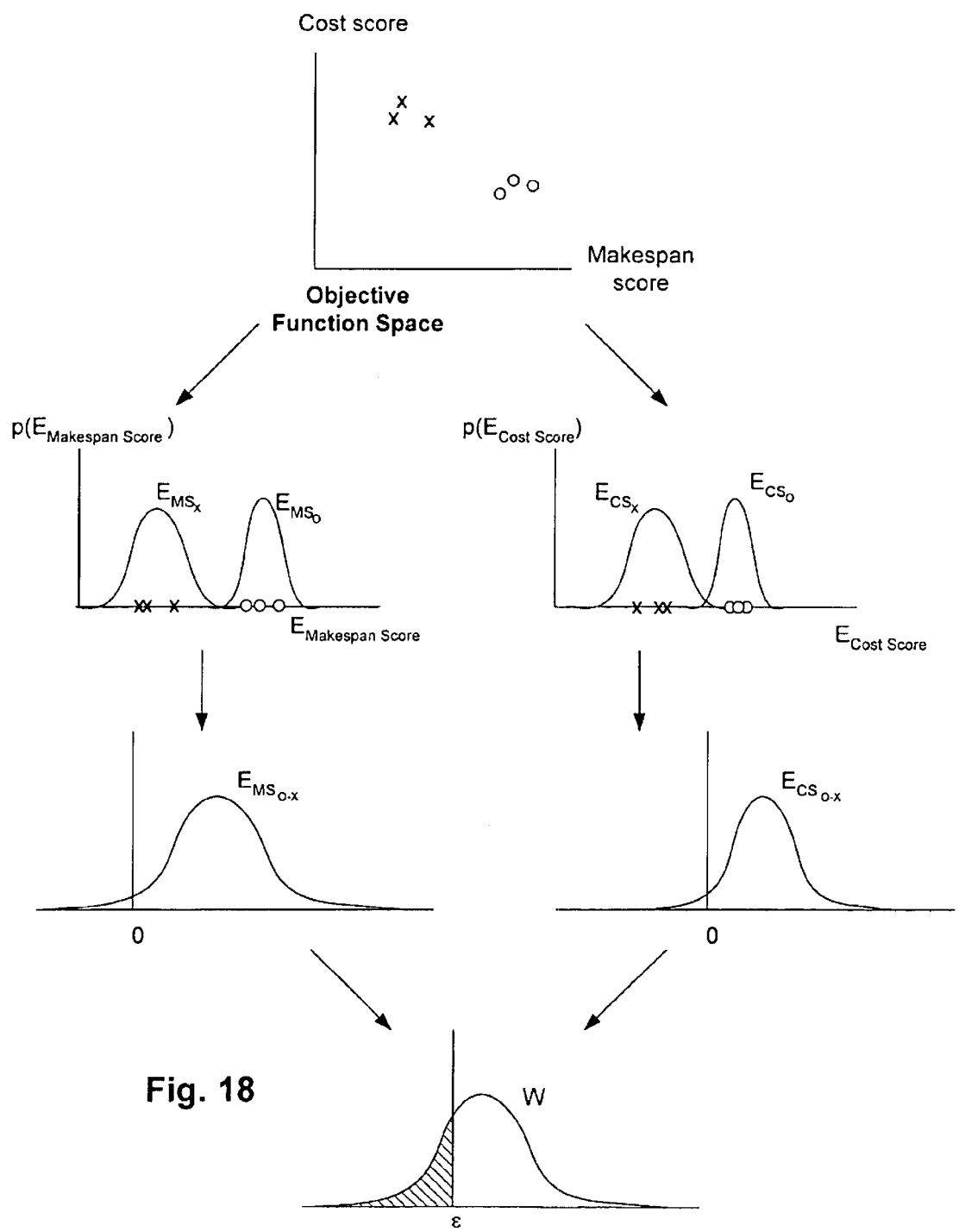
FIG. 18 is a continuation of the schematic diagram of FIG. 17.

A further embodiment is illustrated in FIGS. 17 and 18. In this example there are two design variables: resource use, d1 and resource timing, d2 and there are two objective functions $\phi_1$ and $\phi_2$ corresponding to cost score and makespan score. It is desired to minimize cost (while minimizing makespan).

In comparing two individuals X and O, it is possible that $\phi_1(d1_X, d2_X) < \phi_1(d1_O, d2_O)$ but $\phi_2(d1_X, d2_X) > \phi_2(d1_O, d2_O)$. This represents a tradeoff between individuals X and O. In order to determine a winner in that situation, the example of FIGS. 17 and 18 uses weights $w_1$ and $w_2$ to assign relative importance to cost score and makespan score. Thus an individual's result, W, is a scalar result obtained by a "dot product" multiplication of the objective function values represented by a objective function vector and a corresponding vector of weights. In the present example, the objective function space is two dimensional and $W = w_1 \cdot \text{Fitness}(E_{CSo-x}) + w_2 \cdot \text{Fitness}(E_{MSo-x})$. The step of transforming difference functions ($E_{MSo-x}$, etc.) to the corresponding Fitness functions ($F(E_{MSo-x})$, etc.) has been omitted in FIG. 18.

Note that the corresponding sample variances $S^2_{GSo-x}$ and $S^2_{PSo-x}$ could be computed in a manner similar to the example of FIGS. 3 and 4. In that case, $W = w_1 \cdot \text{Fitness}(E_{CSo-x}) + w_2 \cdot \text{Fitness}(E_{MSo-x}) + w_3 \cdot \text{Fitness}(S^2_{CSo-x}) + w_4 \cdot \text{Fitness}(S^2_{MSo-x})$. Note that even more generally, other estimators of design quality could be used such as partial yields with respect to d1 and d2 (PYd1, PYd2) or overall yield (OY) and a corresponding W could be defined by $W = w_1 \cdot \text{Fitness}(E_{CSo-x}) + w_2 \cdot \text{Fitness}(E_{MSo-x}) + w_3 \cdot \text{Fitness}(S^2_{CSo-x}) + w_4 \cdot \text{Fitness}(S^2_{MSo-x}) + w_5 \cdot PY_{d1O-x} + w_6 \cdot PY_{d2o-x} + w_7 \cdot OY_{O-x}$. The discussion of FIG. 13 above includes a related example.

In the event that the maximum number of samples has been reached, a winner can be forced, as in the single objective function case, by using $\epsilon=0$. However, another possible way of forcing a winner in a multiple objective functions scenario is to select one objective function as being the determinative criterion. For example, if one candidate has a better cost score but the other candidate has a better makespan score, then always choose the candidate with better makespan score.

Although the examples discussed above relate to a two-dimensional design space and a one-dimensional objective function space; and a two-dimensional design space and a two-dimensional objective function space, the present invention is also applicable to higher dimensional spaces. In addition, note that the dimension of the design space is independent of the dimension of the objective function space.

As indicated in FIG. 2, once the tournament winners have been determined in step S230, they form a basis for the next generation of the population e.g. S240. According to the present example, non-dominated individuals are also used (see S250). Specifically, nondominated individuals are individuals that are of interest in determining solutions to the design problem even though they may not have been winners of the tournaments of the current generation. In other words, these are individuals that may still be able to contribute to subsequent generations of the population even though they lost a tournament. Non-dominated individuals represent possibilities on the tradeoff curve that may have been as good as the individual selected as the winner of a tournament or an individual that was overall less fit but still had some outstanding or redeeming characteristic that may be desirable in descendants in future generations.

Initially, the set of non-dominated individuals is set to the enpty set in step S200. In determining tournament winners, however, non-dominated individuals are also identified and added to the set of non-dominated individuals. Then referring to FIG. 2, a subset (i.e. some or all) of the non-dominated individuals are injected into the population consisting of winners (S260). This population is then varied through reproduction mechanisms to produce the next generation. As is known in the art, different possibilities exist to introduce variations to the population including Darwinian reproduction, crossover and mutation. It is possible to use just one of these mechanisms but in the general case, a combination of all three mechanisms is used with different biases. For example, it may be desirable to have relatively little mutation if that mechanism can produce variations that are substantially different from the population being varied with a relatively large chance of producing a non-viable mutated descendant.

The robust optimization of the present invention has many applications. Examples of applications of optimization include an optimization in which the design space is the designable aspects of a schedule; the designable aspects of a chemical process; the designable aspects of a control system; the designable aspects of a neural network; the designable aspects of a regression model of an unknown system; the designable aspects of a molecule; the designable aspects of an optical circuit; the designable aspects of an optical component; the designable aspects of a communications network; and the designable aspects of a sensor.

The present invention can also be used to compare two or more competing candidate solutions is simulated annealing (SA). Here is the pseudocode for a standard SA algorithm:

Select an initial design (perhaps randomly) C0 and an initial temperature T0

Repeat until no better designs can be found

Repeat for a number of optimisation steps for the given temperature

Choose a new design Cn by moving a random amount of design space from one randomly selected design to another Calculate the energy differential Delta E between the current design C and the new one Cn (*) If the new design Cn is more efficient (Delta E<0) or it satisfies the Metropolis criterion R<exp(−Delta E/T) for a random number R, 0<R<1 and an annealing temperature T then Make the new design Cn the current design C Lower the annealing temperature T following the cooling schedule.

An example cooling schedule is the Boltzmann algorithm.

In order to embed the present invention into the standard SA, the line in which comparison between the two individuals only needs to have a specified certainty is changed, rather than assumed 100% certainty as the standard SA algorithm desires. This is the line labelled (*) in the standard SA. Accordingly, in the above pseudo code, the line marked (*) is replaced by (**) "If there is sufficient probabilistic certainty that the new design Cn is more efficient (Delta E<0)"

Another example of the application of the present invention is one in which the search engine is in the class of generalized pattern recognition algorithms. A further example is one in which the search engine is an evolutionary algorithm. While search engines have been referred to herein by the nomenclature of the field, terms such as "simulated annealing" include variants thereof which operate on the same or similar principles. Similarly for tabu search and evolutionary algorithms. For example, the present invention applies to evolutionary algorithms which include the embedding of localized search algorithms such as simulated annealing or generalized pattern search algorithm.

Embodiments of the present invention can be implemented as a computer-readable program product, or part of a computer-readable program product, for distribution or integration in suitable software and hardware systems. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein.

Those skilled in the art will appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer-readable program product may be distributed as a removable medium with accompanying printed or electronic documentation (e.g., shrink-wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer-readable program product) and hardware. Still other embodiments of the invention may be implemented as entirely hardware, or entirely software (e.g., a computer-readable readable program product).

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. In robust design problems using a search engine, a method of selecting one of a first and second technology design candidates, the method comprising:

randomly sampling said first technology design candidate to obtain a first random sample;

determining at least one objective function value from said first random sample;

randomly sampling said second technology design candidate to obtain a second random sample;

determining at least one objective function value from said second random sample;

determining, based on said first and second objective function values comparison-oriented statistical estimates relating the first and second technology design candidates;

selecting, if possible, based on at least one decision rule and said comparison-oriented statistical estimates, one of said technology design candidates; and repeating the previous steps until one of said technology design candidates has been selected.

2. The method of claim 1, wherein selecting based on at least one decision rule and said comparison-oriented statistical estimates, one of said technology design candidates comprises:

determining a first measure of confidence corresponding to the selection of said first technology design candidate over said second technology design candidate;

determining a second measure of confidence corresponding to the selection of said second technology design candidate over said first technology design candidate; and selecting the one of said first and second technology design candidates if said corresponding measure of confidence surpasses a confidence threshold.

3. The method of claim 1, wherein determining, based on said objective function values, comparison-oriented statistical estimates relating said first and second technology design candidates comprises:

determining a first estimator and a second estimator, each estimator being a statistical estimate of design quality from said sample objective function values of respective technology design candidates; and subtracting said first estimator from said second estimator, and subtracting said second estimator from said first estimator.

4. The method of claim 1, wherein determining, based on said objective function values, comparison-oriented statistical estimates relating the first and second technology design candidates comprises:

subtracting one candidate's sample objective function values from the other's to get a set of difference objective function values; and determining a statistical estimate of difference from said difference objective function values.

5. In robust design problems using a search engine, a computer-readable program product for selecting one of first and second technology design candidates based on at least one objective function, the program product comprising:

means for randomly sampling said first technology design candidate to obtain a first random sample;

means for determining at least one objective function value from said first random sample;

means for randomly sampling said second technology design candidate to obtain a second random sample;

means for determining at least one objective function value from said second random sample;

means for determining, based on said first and second objective function values comparison-oriented statistical estimates relating the first and second technology design candidates;

means for selecting, if possible, based on at least one decision rule and said comparison-oriented statistical estimates, one of said technology design candidates; and means for repeating the previous steps until one of said technology design candidates has been selected.

6. In robust design problems using a search engine, a method of selecting one of a first and second technology design candidates, the method comprising:

a) defining a population of individual technology design candidates;

b) selecting at least one objective function that defines at least one objective function value for each individual technology design candidate;

c) repeatedly performing the following steps until at least one stopping criterion is satisfied:

1) grouping individual technology design candidates from the population into at least one group for comparison with other individual technology design candidates in the group, the comparison being on the basis of their at least one objective function values 2) for each group of the at least one groups performing the following:

i) for each individual technology design candidate of the at least one groups, sampling each individual technology design candidate at least one time and determining at least one corresponding objective function value;

ii) statistically determining, based on the sample objective function values, corresponding statistical estimators of design quality;

iii) comparing the sampled individual technology design candidates within each group on the basis of the statistical estimators of design quality;

iv) selecting, if there is enough statistical confidence from the comparison of the statistical estimators, one of the sampled individual technology design candidates from the at least one group;

v) repeating the above steps if a selection has not yet been made; and 3) replacing the population of individual technology design candidates by a new population consisting of the chosen individual technology design candidates from each group.

* * * * *